US012148385B2

(12) United States Patent
Lee et al.

(10) Patent No.: US 12,148,385 B2
(45) Date of Patent: Nov. 19, 2024

(54) SENSING CIRCUIT AND DISPLAY DEVICE INCLUDING THE SAME

(71) Applicant: LG Display Co., Ltd., Seoul (KR)

(72) Inventors: Hyun Soo Lee, Paju-si (KR); Seo Jun Yeom, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/464,047

(22) Filed: Sep. 8, 2023

(65) Prior Publication Data

US 2024/0177674 A1 May 30, 2024

(30) Foreign Application Priority Data

Nov. 29, 2022 (KR) ........................ 10-2022-0162232

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0819* (2013.01); *G09G 2300/0852* (2013.01); *G09G 2310/08* (2013.01); *G09G 2320/0233* (2013.01); *G09G 2320/0295* (2013.01); *G09G 2320/043* (2013.01); *G09G 2320/045* (2013.01); *G09G 2330/12* (2013.01)

(58) Field of Classification Search
CPC ............... G09G 3/3233; G09G 3/3291; G09G 2300/0819; G09G 2300/0852; G09G 2310/08; G09G 2320/0233; G09G 2320/0295; G09G 2320/043; G09G 2320/045; G09G 2330/12
USPC .......................................................... 345/212
See application file for complete search history.

(56) References Cited

U.S. PATENT DOCUMENTS

| | | | | |
|---|---|---|---|---|
| 11,222,597 | B2 | 1/2022 | Bong et al. | |
| 2016/0098961 | A1* | 4/2016 | Han | G09G 3/3291 345/83 |
| 2017/0061877 | A1* | 3/2017 | Lee | G09G 3/3233 |
| 2017/0199616 | A1* | 7/2017 | Kim | G06F 3/0412 |
| 2020/0020278 | A1* | 1/2020 | Lee | G09G 3/3275 |
| 2020/0074930 | A1* | 3/2020 | Lee | G09G 3/3233 |

(Continued)

FOREIGN PATENT DOCUMENTS

| | | | |
|---|---|---|---|
| KR | 10-2016-0092173 | A | 8/2016 |
| KR | 10-2020-0058206 | A | 5/2020 |
| KR | 10-2021-0084244 | A | 7/2021 |

*Primary Examiner* — Tom V Sheng
(74) *Attorney, Agent, or Firm* — Fenwick & West LLP

(57) ABSTRACT

A sensing circuit and a display device including the same are disclosed. The sensing circuit includes: a first external power line connected to a pixel power line applying a pixel driving voltage to pixels; a second external power line connected to the pixel power line; a first selection switch element connected between the first external power line and a voltage source; a current sensor connected to the second external power line; and a second selection switch element connected between the current sensor and the voltage source, wherein the first selection switch element is turned on responsive to a first signal to supply the pixel driving voltage to the first external power line during an image display period, and the second selection switch element is turned on responsive to the second signal and the current sensor measures a current flowing through the second external power line during a sensing period.

26 Claims, 18 Drawing Sheets

(56) References Cited

U.S. PATENT DOCUMENTS

| | | | | |
|---|---|---|---|---|
| 2021/0201815 | A1 | 7/2021 | Bong et al. | |
| 2021/0248943 | A1* | 8/2021 | Kim | G09G 3/20 |
| 2021/0287608 | A1* | 9/2021 | Min | G09G 3/3291 |
| 2022/0122521 | A1* | 4/2022 | Tsai | H05B 45/325 |
| 2022/0139332 | A1* | 5/2022 | Park | G09G 3/3283 345/214 |
| 2022/0319430 | A1* | 10/2022 | Wang | G09G 3/3258 |
| 2023/0010366 | A1* | 1/2023 | Son | G11C 19/28 |
| 2023/0055768 | A1* | 2/2023 | Im | G09G 3/2096 |
| 2023/0081260 | A1* | 3/2023 | Lee | G09G 3/3291 345/94 |
| 2023/0112481 | A1* | 4/2023 | Lee | G09G 3/3275 345/214 |
| 2023/0119909 | A1* | 4/2023 | Yang | G09G 3/2092 345/55 |
| 2023/0133826 | A1* | 5/2023 | Lee | G09G 3/3233 345/55 |
| 2023/0215306 | A1* | 7/2023 | Jung | G09G 3/3266 345/204 |
| 2023/0215346 | A1* | 7/2023 | Cho | G09G 3/32 345/690 |
| 2023/0267885 | A1* | 8/2023 | Cho | H01L 33/44 345/214 |
| 2023/0298493 | A1* | 9/2023 | Pyun | G09G 3/22 |
| 2023/0360589 | A1* | 11/2023 | An | G09G 3/2096 |

* cited by examiner

SENSING CIRCUIT AND DISPLAY DEVICE INCLUDING THE SAME

CROSS-REFERENCE TO RELATED APPLICATION

This application claims priority to and the benefit of Republic of Korea Patent Application No. 10-2022-0162232 filed on Nov. 29, 2022, the disclosure of which is incorporated by reference in its entirety.

BACKGROUND

Field of the Invention

The present disclosure relates to a sensing circuit and a display device including the same.

Discussion of Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel.

In such a display device, when a driving signal such as a scan signal, an emission (EM) signal, and a data signal are supplied to a plurality of sub-pixels formed in the display panel, the selected sub-pixel transmits light or emits light directly to thereby display an image.

Each of the sub-pixels includes a driving thin-film transistor (TFT) which controls a current flowing through a light-emitting element and one or more switch TFTs which switch the current. In this case, degradation due to long time driving of the driving TFT or the like can occur, and a current sensing-based compensation method is applied to compensate for this degradation. However, the current sensing-based compensation method operates at a time in which a user does not watch the display device, but there is a disadvantage in that the current sensing-based compensation method is recognized as a structure in which an organic light-emitting diode (OLED) emits light.

SUMMARY

The present disclosure is directed to solving all the above-described necessity and problems.

The present disclosure is directed to providing a sensing circuit and a display device including the same.

It should be noted that objects of the present disclosure are not limited to the above-described objects, and other objects of the present disclosure will be apparent to those skilled in the art from the following descriptions.

In one embodiment, a sensing circuit is configured to be connected to a display panel to sense electrical characteristics of a plurality of pixels included in the display panel. The sensing circuit comprises: a first external power line that supplies a pixel driving voltage, the first external power line connected to a pixel power line that applies the pixel driving voltage to the plurality of pixels; a second external power line that supplies the pixel driving voltage, the second external power line connected to the pixel power line; a first selection switch element connected between the first external power line and a voltage source, the first selection switch element controlled by a first enable signal; a current sensor connected between the second external power line and the pixel power line; and a second selection switch element connected between the current sensor and the voltage source, the second selection switch element controlled by a second enable signal, wherein the first selection switch element is turned on responsive to the first enable signal, the first selection switch element while turned on connects the first external power line and the voltage source such that the pixel driving voltage is supplied to the pixel power line via the first external power line during an image display period in which the plurality of pixels are driven, and the second selection switch element is turned on responsive to the second enable signal, the second selection switch element while turned on connects the second external power line and the voltage source such that a current flowing through the second external power line is measured by the current sensor and the pixel driving voltage is supplied to the pixel power line via the second external power line during a sensing period during which the electrical characteristics of the plurality of pixels are sensed.

In one embodiment, a display device comprises: a first external power line configured to supply a pixel driving voltage; a second external power line configured to supply the pixel driving voltage; a pixel power line connected to the first external power line and the second external power line, the pixel power line configured to receive the pixel driving voltage from the first external power line or the second external power line; a first selection switch element connected between the first external power line and a voltage source, the first selection switch element configured to connect the voltage source and the first external power line responsive to a first signal; a current sensor connected between the second external power line and the pixel power line; a second selection switch element connected between the current sensor and the voltage source, the second selection switch element configured to connect the voltage source and the second external power line responsive to a second signal; and a display panel including a subpixel connected to the pixel power line, the subpixel including a light emitting element configured to emit light, wherein during a sensing period during which an electrical characteristic of a part of the subpixel is sensed, the second selection switch element is turned on responsive to the second signal and the first selection switch element is turned off to connect the second external power line and the voltage source such that a current flowing through the second external power line is measured by the current sensor during the sensing period, and the pixel driving voltage is supplied to the subpixel from the pixel power line via the second external power line without the light emitting element emitting light during the sensing period.

In one embodiment, a display device comprises: a display panel including a plurality of pixels that are connected to a pixel power line to which a pixel driving voltage is supplied, the plurality of pixels divided into a plurality of rows of pixel blocks that extend along a first direction and each pixel block including a different subset of pixels from the plurality of pixels; a plurality of data lines that are connected to the plurality of pixels, the plurality of data lines extending along a second direction that intersects the first direction; a plurality of gate lines that are connected to the plurality of pixels and extend along the first direction, the plurality of gate lines applying gate signals to the plurality of pixels; a data driver configured to supply a plurality of data voltages of an image to the plurality of data lines during an image display period, and to supply sensing data to the plurality of data lines during a sensing period; and a sensing circuit configured to sense current flowing through the pixel power line that is connected to a subset of the plurality of pixels included in a pixel block from the plurality of pixel blocks during the sensing period based on the sensing data supplied to the respective subset of pixels during the sensing period, the sensing circuit including: a first external power line that supplies the pixel driving voltage, the first external power line connected to the pixel power line; a second external power line that supplies the pixel driving voltage, the second external power line connected to the pixel power line; a first selection switch element connected between the first external power line and a voltage source, the first selection switch element configured to connect the voltage source and the first external power line such that the first external power line supplies the pixel driving voltage to the pixel power line responsive to a first signal; a current sensor connected between the second external power line and the pixel power line; and a second selection switch element connected between the current sensor and the voltage source, the second selection switch element configured to connect the voltage source and the second external power line such that the second external power line supplies the pixel driving voltage to the pixel power line responsive to a second signal.

According to the present disclosure, light emission of a light-emitting element can be suppressed, during a sensing period in which electrical characteristics of pixels are sensed, by connecting an external power line to which a current sensor is connected to a power line to which a pixel driving voltage of a pixel circuit is applied, and making a current path by the pixel driving voltage in the pixel circuit bypass the light-emitting element during the sensing period.

According to the present disclosure, since sensing in units of blocks is performed using a current sensor connected to an external power line, a sensing time can be shortened compared to a sensing method in pixel units, and it is possible to realize in a simple structure.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
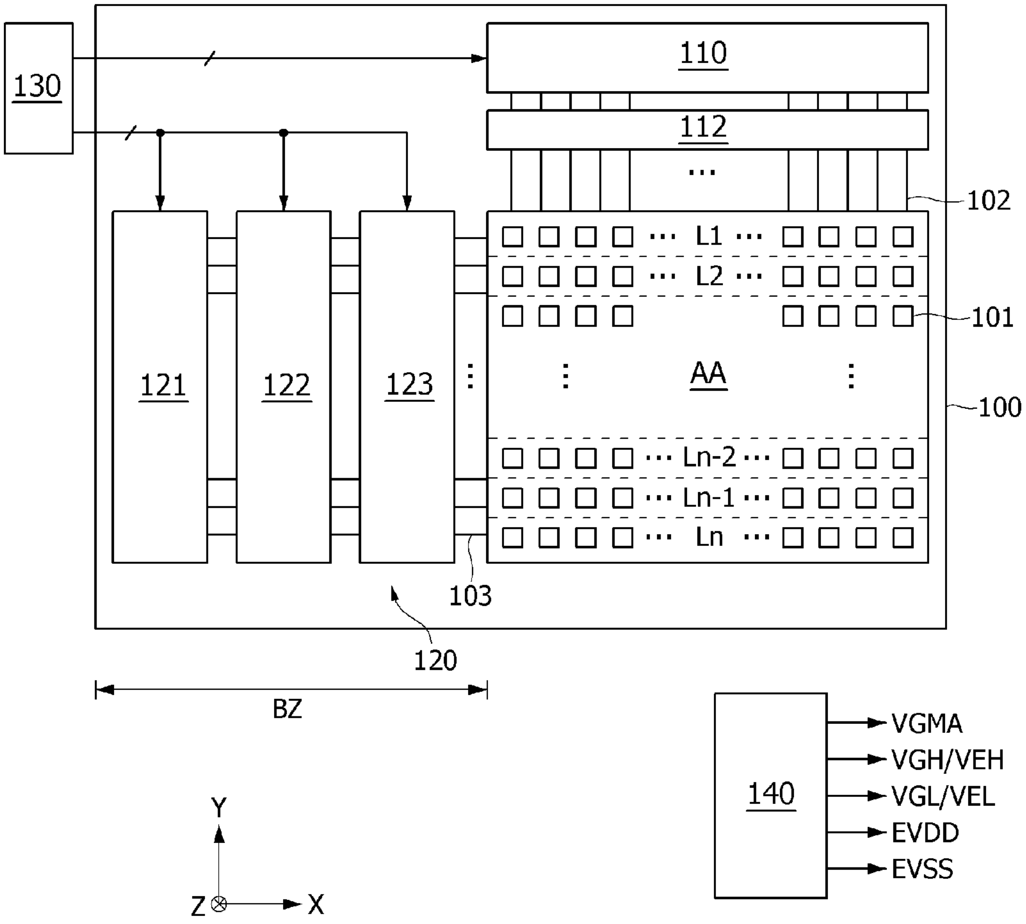
FIG. 1 is a block diagram of a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

Figure 2:
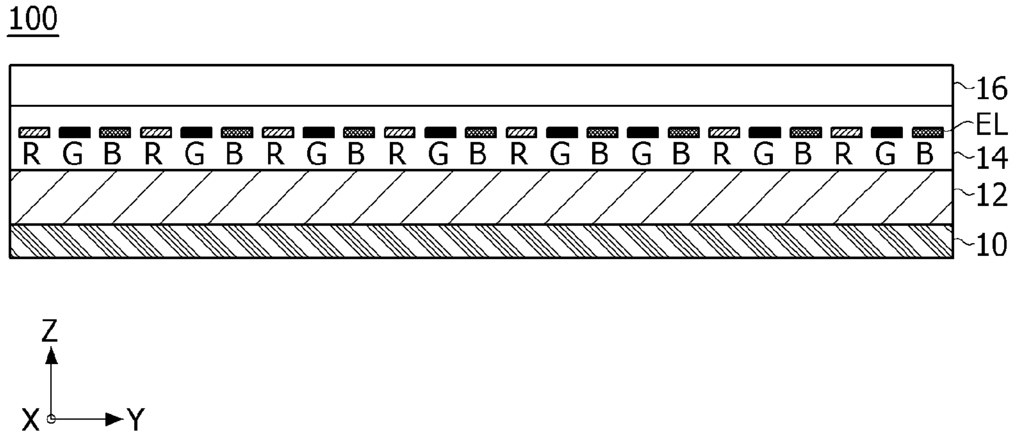
FIG. 2 is a view illustrating a cross-sectional structure of a display panel shown in FIG. 1 according to an embodiment of the present disclosure.

FIG. 1 is a block diagram of a display device according to an embodiment of the present disclosure, and FIG. 2 is a view illustrating a cross-sectional structure of a display panel shown in FIG. 1 according to an embodiment of the present disclosure.

Referring to FIG. 1, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 includes a pixel array AA that displays an input image. The pixel array AA includes a plurality of data lines 102, a plurality of gate lines 103 that intersect with the data lines 102, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the same gate line 103. Sub-pixels arranged in a column direction Y along a data line direction share the same data line 102. One horizontal period 1H is a time obtained by dividing one frame period by the total number of pixel lines L1 to Ln.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film is formed on the back plate. The pixel array AA and a touch sensor array may be formed on the organic thin film. The back plate blocks moisture permeation so that the pixel array AA is not exposed to humidity. The organic thin film may be a thin polyimide (PI) film substrate. A multi-layered buffer film may be formed of an insulating material (not shown) on the organic thin film. Lines may be formed on the organic thin film so as to supply power or signals applied to the pixel array AA and the touch sensor array.

To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels 101 includes a pixel circuit. The pixel circuit is connected to the data line 102 and the gate line 103.

Hereinafter, a pixel may be interpreted as having the same meaning as a sub-pixel.

As shown in FIG. 2, when viewed from a cross-sectional structure, the display panel 100 may include a circuit layer 12, a light emitting element layer 14, and an encapsulation layer 16 stacked on a substrate 10.

The circuit layer 12 may include a pixel circuit connected to wirings such as a data line, a gate line, and a power line, a gate driver (GIP) connected to the gate lines, a de-multiplexer array 112, a circuit (not shown) for auto probe inspection, and the like. The wirings and circuit elements of the circuit layer 12 may include a plurality of insulating layers, two or more metal layers separated with the insulating layer therebetween, and an active layer including a semiconductor material. All transistors formed in the circuit layer 12 may be implemented as oxide TFTs having an n-channel type oxide semiconductor.

The light emitting element layer 14 may include a light emitting element EL driven by a pixel circuit. The light emitting element EL may include a red (R) light emitting element, a green (G) light emitting element, and a blue (B) light emitting element. The light emitting element layer 14 may include a white light emitting element and a color filter. The light emitting elements EL of the light emitting element layer 14 may be covered by a protective layer including an organic film and a passivation film.

The encapsulation layer 16 covers the light emitting element layer 14 to seal the circuit layer 12 and the light emitting element layer 14. The encapsulation layer 16 may have a multilayered insulating structure in which an organic film and an inorganic film are alternately stacked. The inorganic film blocks the penetration of moisture and oxygen. The organic film planarizes the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked.

A touch sensor layer may be disposed on the encapsulation layer 16. The touch sensor layer may include capacitive type touch sensors that sense a touch input based on a change in capacitance before and after the touch input. The touch sensor layer may include metal wiring patterns and insulating layers forming the capacitance of the touch sensors. The capacitance of the touch sensor may be formed between the metal wiring patterns. A polarizing plate may be disposed on the touch sensor layer. The polarizing plate may improve visibility and contrast ratio by converting the polarization of external light reflected by metal of the touch sensor layer and the circuit layer 12. The polarizing plate may be implemented as a polarizing plate in which a linear polarizing plate and a phase delay film are bonded, or a circular polarizing plate. A cover glass may be adhered to the polarizing plate.

The display panel 100 may further include a touch sensor layer and a color filter layer stacked on the encapsulation layer 16. The color filter layer may include red, green, and blue color filters and a black matrix pattern. The color filter layer may replace the polarizing plate and increase the color purity by absorbing a part of the wavelength of light reflected from the circuit layer and the touch sensor layer. In this embodiment, by applying the color filter layer 20 having a higher light transmittance than the polarizing plate to the display panel, the light transmittance of the display panel PNL can be improved, and the thickness and flexibility of the display panel PNL can be improved. A cover glass may be adhered on the color filter layer.

The power supply 140 generates direct current (DC) power required for driving the pixel array AA and the display panel driving circuit of the display panel 100 by using a DC-DC converter. The DC-DC converter may include a charge pump, a regulator, a buck converter, a boost converter, and the like. The power supply 140 may adjust a DC input voltage from a host system (not shown) and thereby generate DC voltages such as a gamma reference voltage VGMA, gate-on voltages VGH and VEH, gate-off voltages VGL and VEL, a pixel driving voltage EVDD, and a pixel low-potential power supply voltage EVSS. The gamma reference voltage VGMA is supplied to a data driver 110. The gate-on voltages VGH and VEH and the gate-off voltages VGL and VEL are supplied to a gate driver 120. The pixel driving voltage EVDD and the pixel low-potential power supply voltage EVSS are commonly supplied to the pixels.

The display panel driving circuit writes pixel data (digital data) of an input image to the pixels of the display panel 100 under the control of a timing controller (TCON) 130.

The display panel driving circuit includes the data driver 110 and the gate driver 120.

A de-multiplexer (DEMUX) array 112 may be disposed between the data driver 110 and the data lines 102. The de-multiplexer array 112 sequentially connects one channel of the data driver 110 to the plurality of data lines 102 and distributes in a time division manner the data voltage outputted from one channel of the data driver 110 to the data lines 102, thereby reducing the number of channels of the data driver 110. The de-multiplexer array 112 may be omitted. In this case, output buffers of the data driver 110 are directly connected to the data lines 102.

The display panel driving circuit may further include a touch sensor driver for driving the touch sensors. The touch sensor driver is omitted from FIG. 1. In a mobile device, the timing controller 130, the power supply 140, the data driver 110, and the like may be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is output through the output buffer AMP in each of the channels of the data driver 110.

In the data driver 110, the output buffer included in one channel may be connected to adjacent data lines 102 through the de-multiplexer array 112. The de-multiplexer array 112 may be formed directly on the substrate of the display panel 100 or integrated into one drive IC together with the data driver 110.

The gate driver 120 may be implemented as a gate in panel (GIP) circuit formed directly on a bezel BZ area of the display panel 100 together with the TFT array of the pixel array AA. The gate driver 120 sequentially outputs gate signals to the gate lines 103 under the control of the timing controller 130. The gate driver 120 may sequentially supply the gate signals to the gate lines 103 by shifting the gate signals using a shift register.

The gate signal may include a scan signal for selecting pixels of a line in which data is to be written in synchronization with the data voltage, and an EM signal defining an emission time of pixels charged with the data voltage.

The gate driver 120 may include a scan driver 121, an EM driver 122, and an initialization driver 123 in one embodiment.

The scan driver 121 outputs a scan signal SCAN in response to a start pulse and a shift clock from the timing controller 130, and shifts the scan signal SCAN according to the shift clock timing. The EM driver 122 outputs an EM signal EM in response to a start pulse and a shift clock from the timing controller 130, and sequentially shifts the EM signal EM according to the shift clock. The initialization driver 123 outputs an initialization signal INIT in response to a start pulse and a shift clock from the timing controller 130, and shifts the initialization signal INIT according to the shift clock timing. Therefore, the scan signal SCAN, the EM signal EM, and the initialization signal INIT are sequentially supplied to the gate lines 103 of the pixel lines L1 to Ln. In case of a bezel-free model, at least some of transistors constituting the gate driver 120 and clock wirings may be dispersedly disposed in the pixel array AA.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The host system may be any one of a television (TV) system, a set-top box, a navigation system, a personal computer (PC), a home theater system, a vehicle system, and a mobile device system.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer array 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing control signal includes the start pulse and the shift clock.

Figure 3:
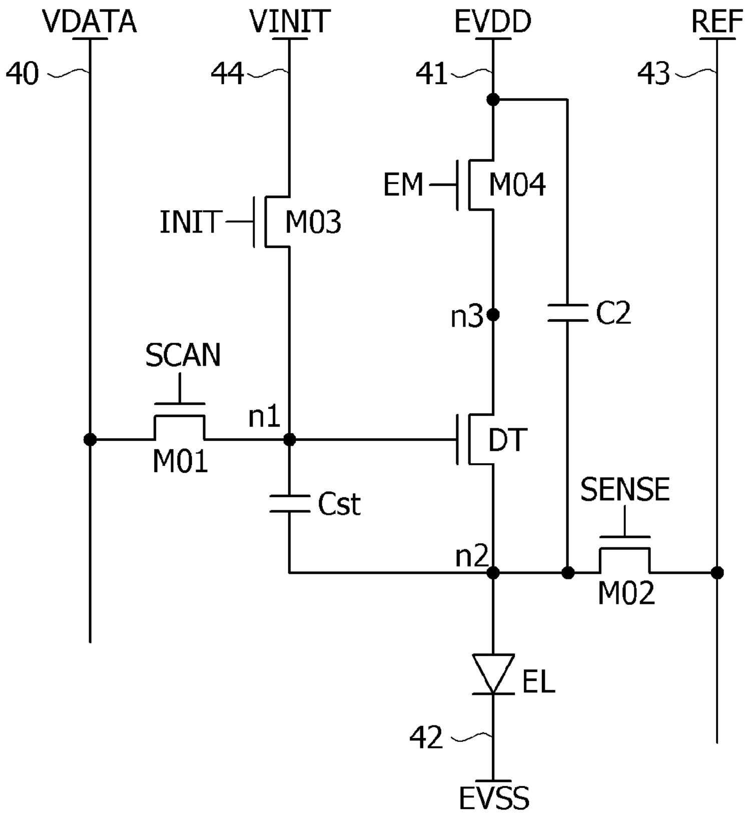
FIG. 3 is a circuit diagram illustrating a pixel circuit connected to an external compensation circuit according to an embodiment of the present disclosure.

FIG. 3 is a circuit diagram illustrating a pixel circuit connected to an external compensation circuit according to one embodiment of the present disclosure.

Referring to FIG. 3, a pixel circuit according to a first embodiment of the present disclosure includes a light-emitting element EL, a driving element DT which supplies current to the light-emitting element EL, a plurality of switch elements M01, M02, M03, and M04 which switch current paths connected to the driving element DT, and a first capacitor Cst and a second capacitor C2 which store a gate-source voltage of the driving element DT. The driving element DT and the switch elements M01, M02, M03, and M04 may be implemented as N-channel oxide thin film transistors (TFTs).

The light emitting element EL emits light by a current applied through a channel of the driving element DT according to a gate-source voltage Vgs of the driving element DT that varies according to a data voltage Vdata. The light-emitting element EL may be implemented as an organic light-emitting diode (OLED) including an organic compound layer formed between an anode and a cathode. The organic compound layer may include a hole injection layer HIL, a hole transport layer HTL, a light-emitting layer EML, an electron transport layer ETL, an electron injection layer EIL, and the like, but is not limited thereto. The anode of the light-emitting element EL is connected to the driving element DT through a second node n2, and the cathode of the light-emitting element EL is connected to a second power line 42 to which a low-potential power voltage EVSS is applied.

The driving element DT drives the light emitting element EL by supplying a current to the light emitting element EL according to the gate-source voltage Vgs. The driving element DT includes a gate electrode connected to a first node n1, a first electrode (or drain electrode) connected to a third node n3, and a second electrode (or source electrode) connected to a second node n2.

A first switch element M01 is turned on according to a gate-on voltage of a scan signal SCAN to connect a data voltage line 40 to a first node n1 and apply a data voltage VDATA. The first switch element M01 includes a gate electrode to which the scan signal SCAN is applied, a first electrode connected to the data voltage line 40 to which the data voltage is applied, and a second electrode connected to the first node n1.

A second switch element M02 is turned on according to a gate-on voltage of a sensing signal SENSE to connect a reference voltage line 43 to the second node n2 and apply a reference voltage REF. The second switch element M02 includes a gate electrode to which the sensing signal SENSE is applied, a first electrode connected to the reference voltage line 43 to which the reference voltage is applied, and a second electrode connected to the second node n2.

A third switch element M03 is turned on according to a gate-on voltage of an initialization signal INIT to connect an initialization voltage line 44 to the first node n1 to apply an initialization voltage VINIT. The third switch element M03 includes a gate electrode to which the initialization signal INIT is applied, a first electrode connected to the initialization voltage line 44, and a second electrode connected to the first node n1.

A fourth switch element M04 is turned on according to a gate-on voltage of an emission control (EM) signal EM to connect a first power line 41 to a third node n3 to apply a pixel driving voltage EVDD. The fourth switch element M04 includes a gate electrode to which the EM signal EM is applied, a first electrode connected to the first power line, and a second electrode connected to the third node n3.

The first capacitor Cst may be connected between the first node n1 and the second node n2. The first capacitor Cst charges a gate-source voltage Vgs of the driving element DT.

The second capacitor C2 may be connected between the first power line 41 and the second node n2.

FIGS. 4 to 11 are views for describing a current sensing principle according to the embodiment.

Figure 4:
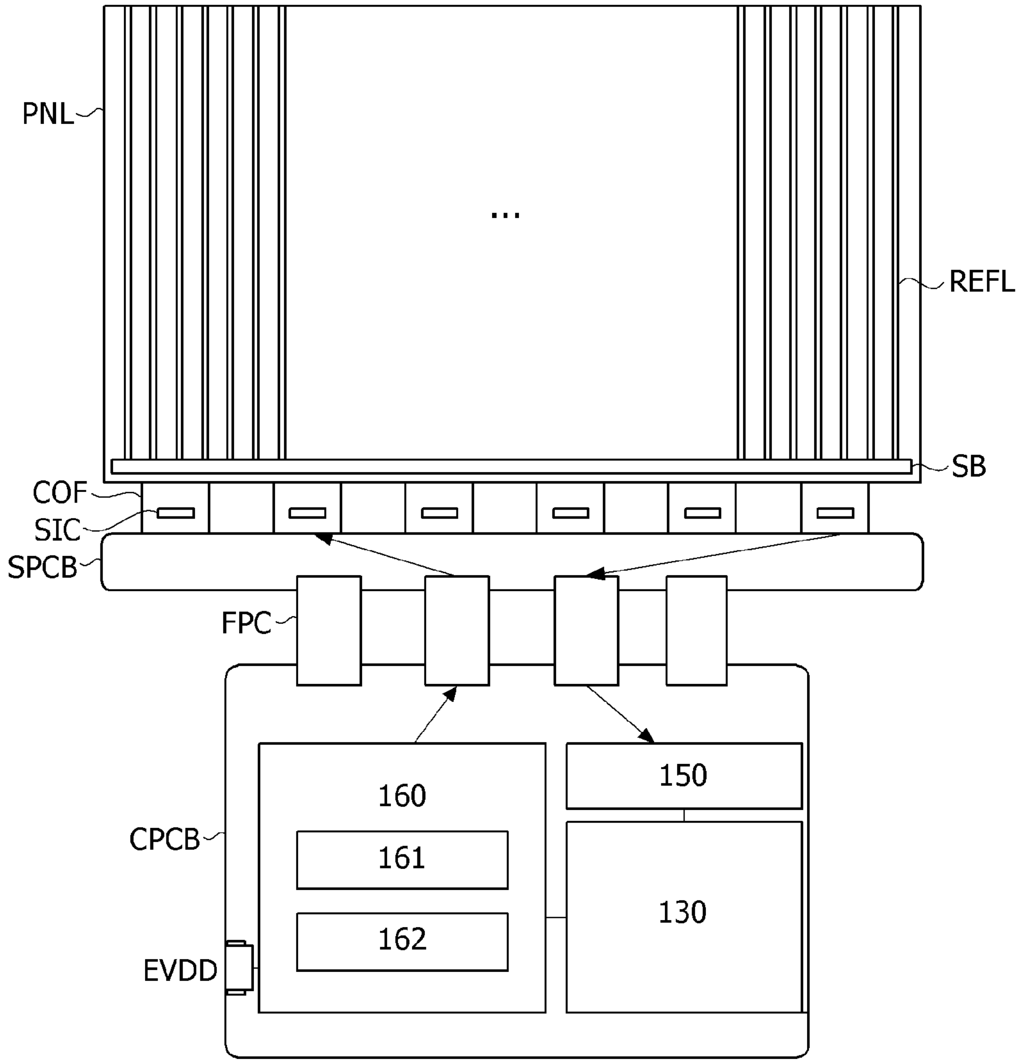
FIGS. 4, 5, 6, 7A, 7B, 8, 9, 10, and 11 are views for describing a current sensing principle according to an embodiment of the present disclosure.

Referring to FIG. 4, chips on film (COFs) may be attached to a display panel PNL. The COF includes a drive integrated circuit (IC) SIC and connects a source printed circuit board (PCB) SPCB to the display panel PNL. The drive IC SIC includes a data driver.

A timing controller 130 and a power supply unit 150 may be mounted on a control PCB CPCB. The control PCB CPCB may be connected to a source PCB SPCB through flexible circuit films, for example, flexible printed circuits (FPCs).

The timing controller 130 may include a reference voltage controller to adjust a reference voltage Vref output from the power supply unit 150 based on a comparison result of a reference voltage Vref_sensed sensed from the display panel PNL and the reference voltage Vref output from the power supply unit 150.

The reference voltage Vref output from the power supply unit 150 may be supplied to the display panel PNL via the FPCs, the source PCB SPCB, and the COFs. Accordingly, in the display panel PNL, input units IN of the reference voltage Vref are close to the drive ICs SIC.

Reference voltage lines REFL on the display panel PNL may be connected to the power supply unit 150 via the COFs, the SPCB, and the FPCs. The reference voltage lines REFL may become a group by a shorting bar SB. The shorting bar is formed on one side of the display panel PNL, and may be formed as a line of glass (LOG) line not in the drive ICs SIC but on the display panel. The reference voltage lines REFL connected to all pixels on the display panel PNL may be connected to the shorting bar.

The sensing circuit 160 may include a first sensing circuit 161 and a second sensing circuit 162 in one embodiment.

The first sensing circuit 161 may connect different external power lines between a voltage source and the pixels according to an image display period and a sensing period. For example, the first sensing circuit 161 may connect a first external power line L1 during the image display period and connect a second external power line L2 during the sensing period.

The second sensing circuit 162 may sense a current flowing through the second external power line to which a high-potential voltage EVDD is applied during the sensing period, and provide a digital value corresponding to the sensed current to the timing controller 130. The timing controller 130 may generate a compensation value for the corresponding pixel block based on a received digital value, and add or multiply the generated compensation value to pixel data of an input image to compensate for changes in electrical characteristics of pixels included in the corresponding pixel block.

Figure 5:
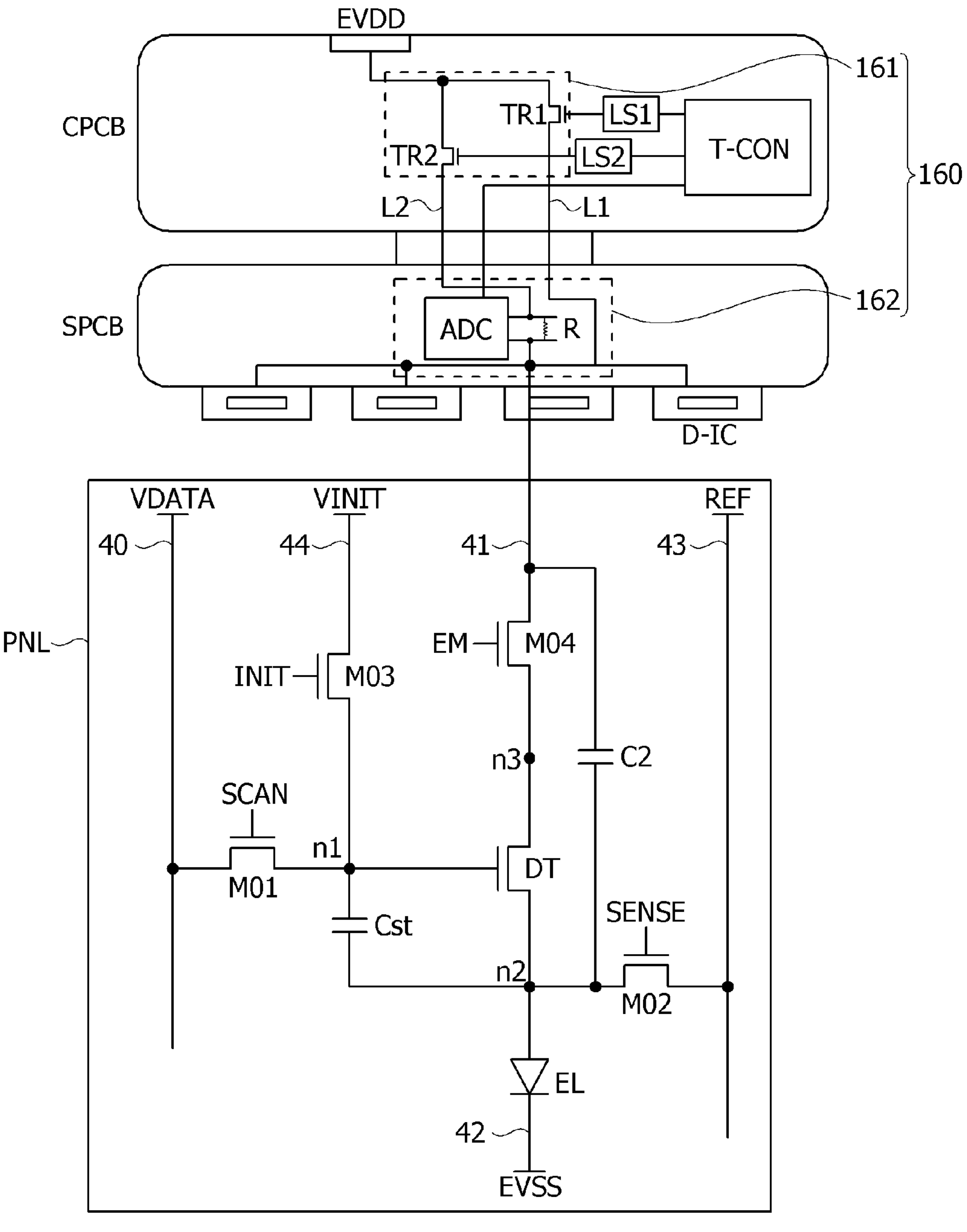

Referring to FIG. 5, the first sensing circuit 161 and the second sensing circuit 162 may be mounted on different PCBs. For example, the first sensing circuit 161 may be mounted on the control PCB CPCB, and the second sensing circuit 162 may be mounted on the source PCB SPCB.

The first sensing circuit 161 may include a first selection switch element TR1 and a second selection switch element TR2, the first selection switch element TR1 may be connected between the first external power line L1 and the voltage source, and the second selection switch element TR2 may be connected between the second external power line L2 and the voltage source.

The second sensing circuit 162 may include a current sensor R connected to the second external power line that is connected to a pixel power line and an analog-to-digital converter (ADC) connected to the current sensor. Here, the current sensor R may be a shunt resistor.

During the display period, the high-potential voltage EVDD is applied to pixels PXL through the pixel power line via the first external power line L1. During the sensing period, the high-potential voltage is applied to the pixels via the second external power line L2 and via the pixel power line and the resistor R, and a current flowing through the resistor R is sensed.

Figure 6:
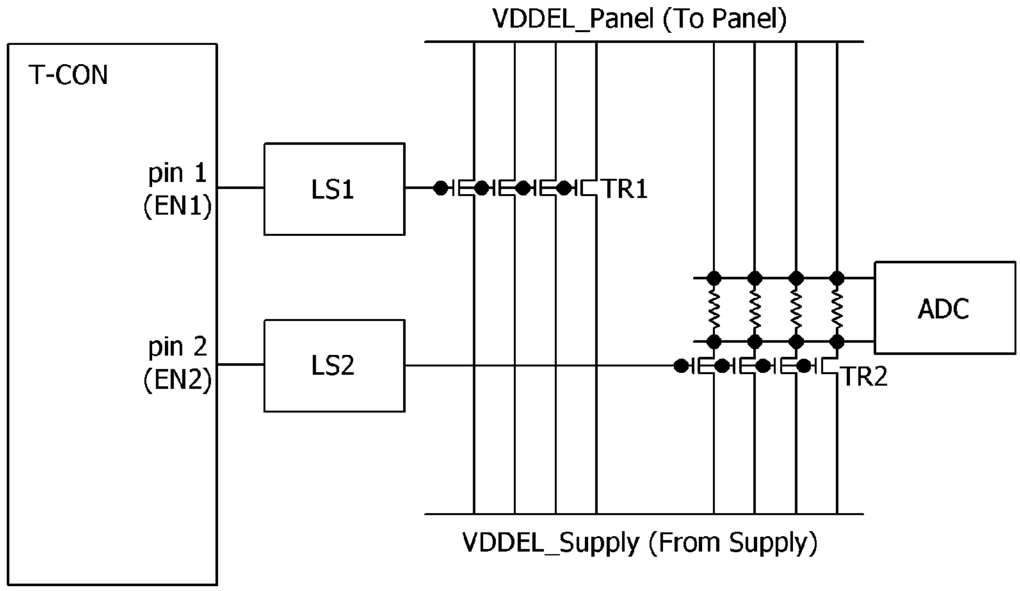

Referring to FIG. 6, the timing controller 130 may include a first pin pin1 which outputs a first enable signal EN1 to be applied to the first selection switch element TR1 and a second pin pin2 which outputs a second enable signal EN2 to be applied to the second selection switch element TR2.

A first level shifter LS1 may be connected to the first pin and convert the first enable signal EN1 output through the first pin to a predetermined voltage level to apply the first enable signal EN1 to the first selection switch element TR1. A second level shifter LS2 may be connected to the second pin and convert the second enable signal EN2 output through the second pin to a predetermined voltage level to apply the second enable signal EN2 to the second selection switch element TR2.

In this case, each of the first level shifter LS1 and the second level shifter LS2 may include a logic circuit which inverts a phase of the signal input from the timing controller 130 and a buffer circuit which converts a voltage of a signal output from the logic circuit to a high voltage level and a low voltage level.

Each of the first selection switch element TR1 and the second selection switch element TR2 may include a plurality of selection switch elements. A total number of selection switch elements is a predetermined number and the predetermined number may be determined using a maximum value of a current flowing through the display panel or widths of the first external power line and the second external power line.

For example, the predetermined number may be determined as a value acquired by dividing the maximum value of the current flowing through the display panel by a maximum value of a current flowing through the first selection switch element or the second selection switch element. That is, the value is based on a quotient of the maximum value of the current flowing through the display panel and a maximum value of a current flowing through the second selection switch element TR2. In one embodiment, the maximum value of the current flowing through the second selection switch element TR2 measured by the second sensing circuit 162 is a proxy for the maximum value of the current flowing through the first selection switch element TR1.

As another example, the predetermined number may be determined as a value acquired by dividing the width of the first external power line or the second external power line by a width of first selection switch element or the second selection switch element.

Figure 7A:
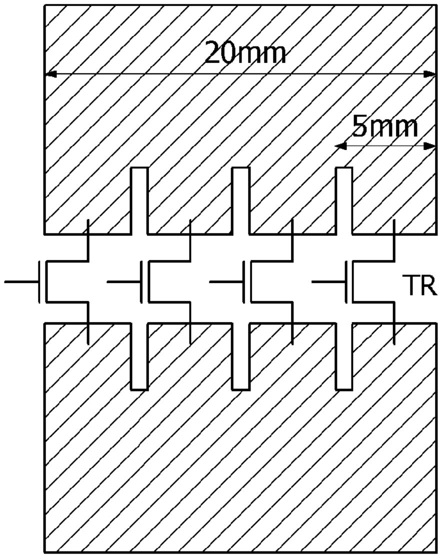

Referring to FIG. 7A, when the width of the first external power line L1 is 20 mm and the width of the first selection switch element is 5 mm, the predetermined number may be determined to be four according to a case in which 20 mm/5 mm is equal to 4.

Figure 7B:
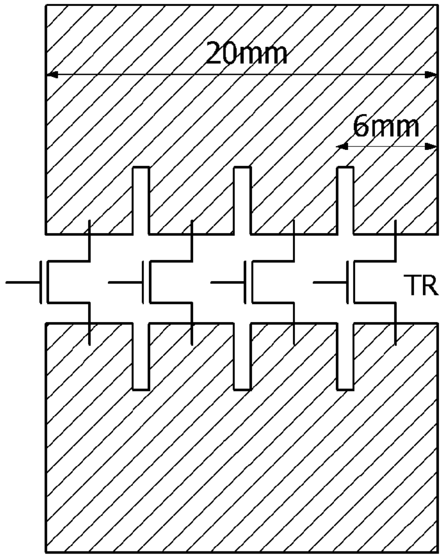

Referring to FIG. 7B, the predetermined number is determined by a quotient of a result of a division operation, but for example, when there is a remainder such as a case in which 20 mm/6 mm (where 6 mm is the width of the first selection switch element) is equal to 3.33, the quotient may be rounded up and determined to be four.

In this case, the predetermined number may be a greater value among the values determined using the maximum value of the current flowing through the display panel and the widths of the first external power line and the second external power line.

For example, since the predetermined number of elements is 4 when the width of the first external power line is 20 mm and the width of the first selection switch element is 5 mm, and the predetermined number of elements is three when the maximum value of the current flowing through the display panel is 1.8 A and the maximum value of the current flowing through the first selection switch element is 0.6 A, finally, the predetermined number of elements may be determined to be four.

Figure 8:
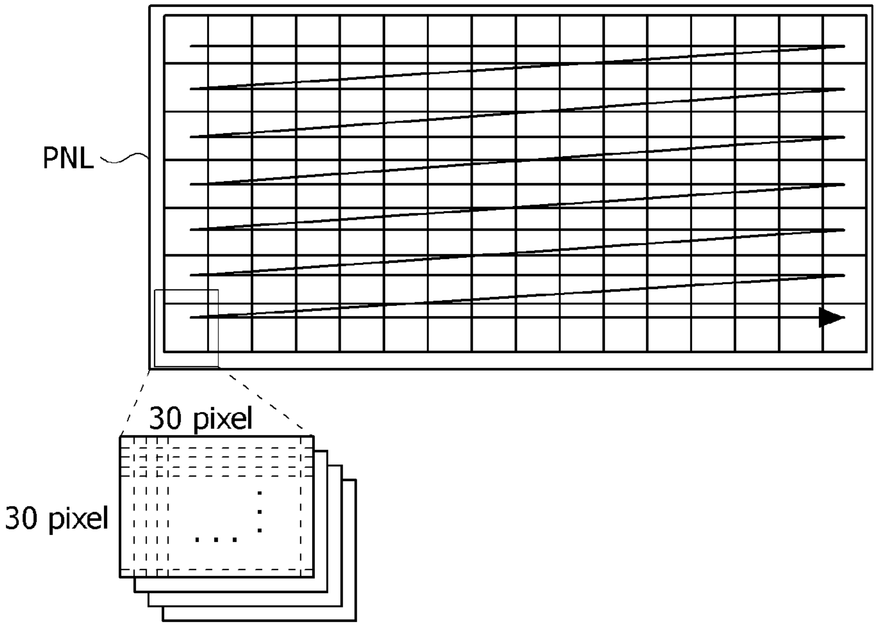

Referring to FIG. 8, the sensing circuits sense the current in units of blocks including a predetermined number of pixels. Here, the block may have a square shape in which the number of pixels in a line direction X and the number of pixels in a column direction Y are the same, for example, 30 pixels×30 pixels. The block is not limited to the square shape and may be implemented in various shapes.

The sensing circuits sense the current in units of blocks, and sense the current flowing through each block in a predetermined order. Different currents are sensed according to a characteristic and a degradation degree of each of the pixels included in the blocks.

A method of sensing the current in units of blocks may have a shortened total sensing time compared to a method of sensing the current in units of pixels, and may be implemented in a simple structure.

Figure 9:
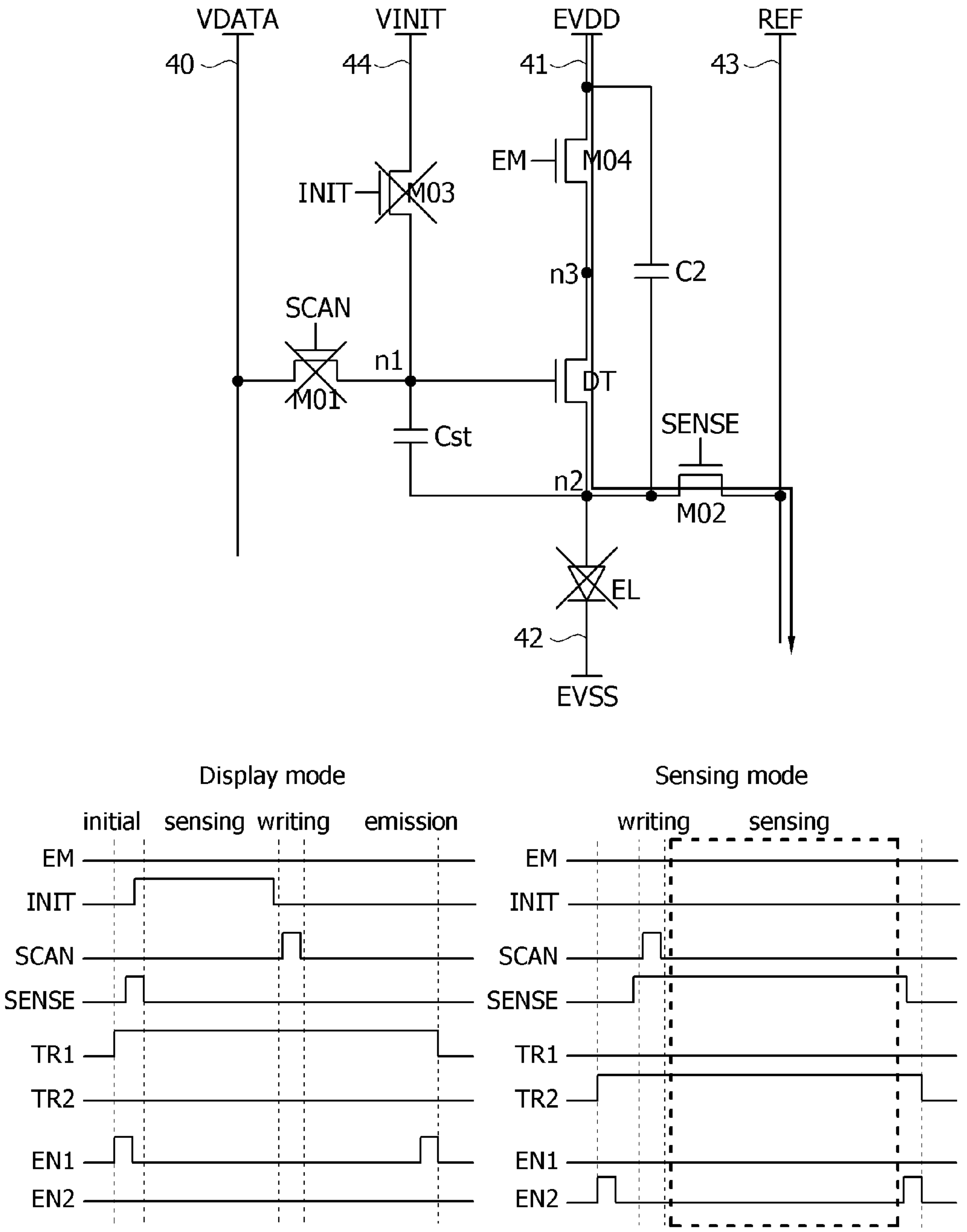

Referring to FIG. 9, in the embodiment, when the second selection switch element is turned on by the second enable signal during the sensing period, since the second switch element M02 and the fourth switch element M04 are turned on, it is possible to perform current sensing without making the light-emitting element emit light by forming a current path through which a current flowing through a pixel driving voltage line 41 does not flow through the light-emitting element but flows through the reference voltage line 43.

Figure 10:
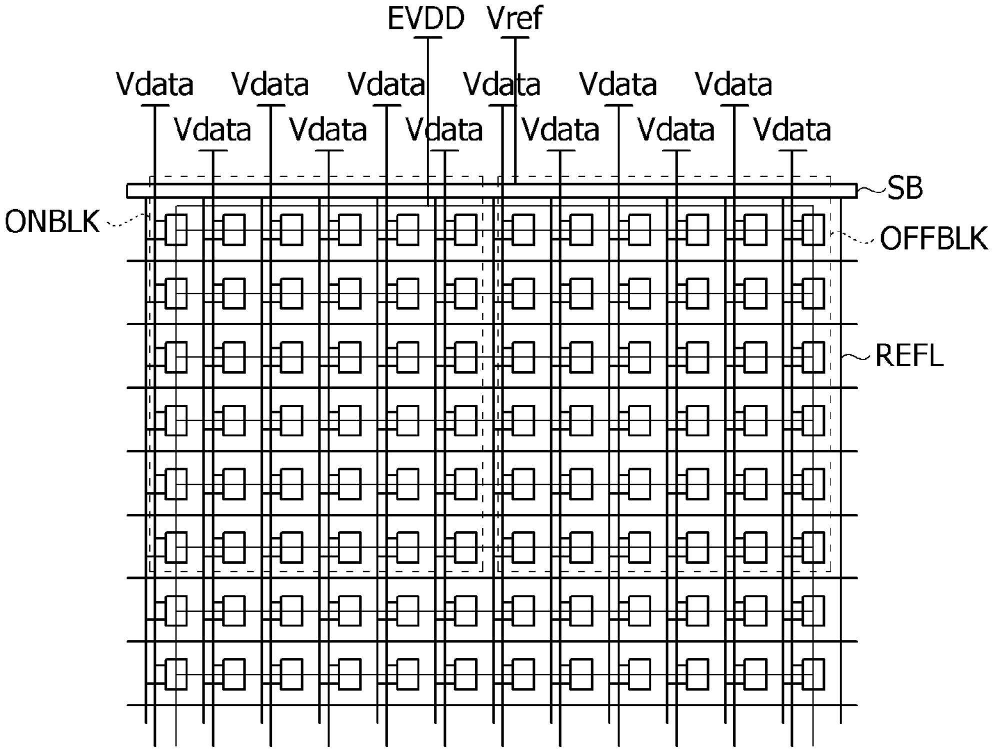

Referring to FIG. 10, in the embodiment, a pixel structure for sensing the current in units of blocks is illustrated. The reference voltage line and a high-potential voltage line are connected to all pixels on the display panel to be shared, and the data voltage line is connected to each of the pixels in the column direction Y.

Accordingly, even when the reference voltage Vref and the high-potential voltage EVDD are applied to all pixels on the display panel, it is possible to select the block in which the sensing is performed according to whether the data is applied. For example, white image data (e.g., first predetermined data or sensing data) is applied to all pixels in first blocks ONBLK in which the sensing is performed via the data lines connected to the pixels in the first blocks ONBLK, and black image data (e.g., second predetermined data) is applied to all pixels in second blocks OFFBLK in which the sensing is not performed via the data lines connected to the pixels in the second blocks OFFBLK.

Here, while white image data is applied to one block on the display panel, the black image data is applied to the remaining blocks.

When the white image data is applied to all pixels in the first blocks in which the sensing is performed, a sensing unit senses the current flowing through the pixel driving voltage line. In this case, since the current flowing through the pixel driving voltage line has a large value in units of blocks, an integrator is not required in the sensing unit.

Figure 11:
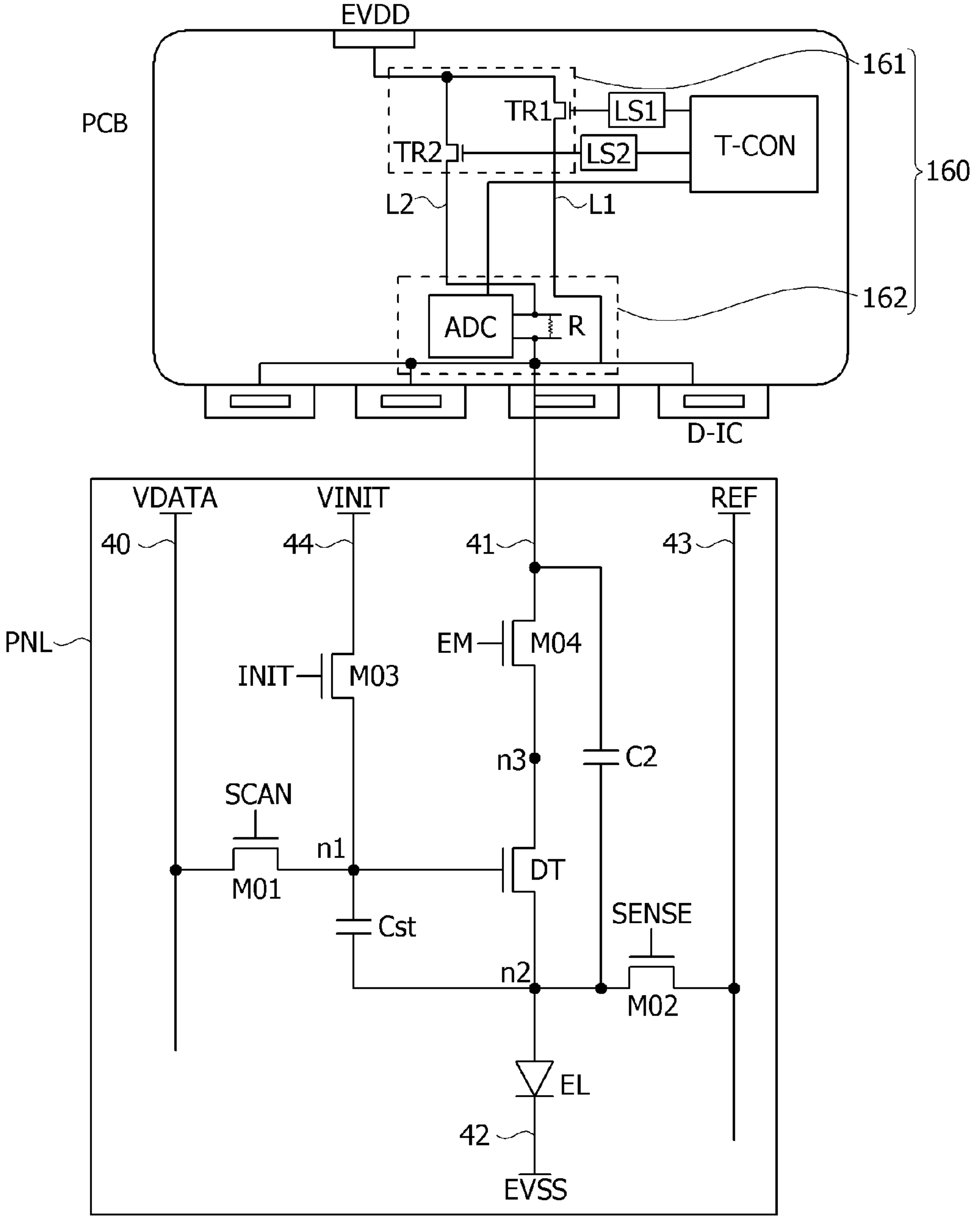

Referring to FIG. 11, the first sensing circuit 161 and the second sensing circuit 162 may be mounted on the same one PCB. For example, the first sensing circuit 161 and the second sensing circuit 162 may be mounted on a driving PCB in which the control PCB CPCB and the source PCB SPCB shown in FIG. 5 are integrated into one.

Figure 12:
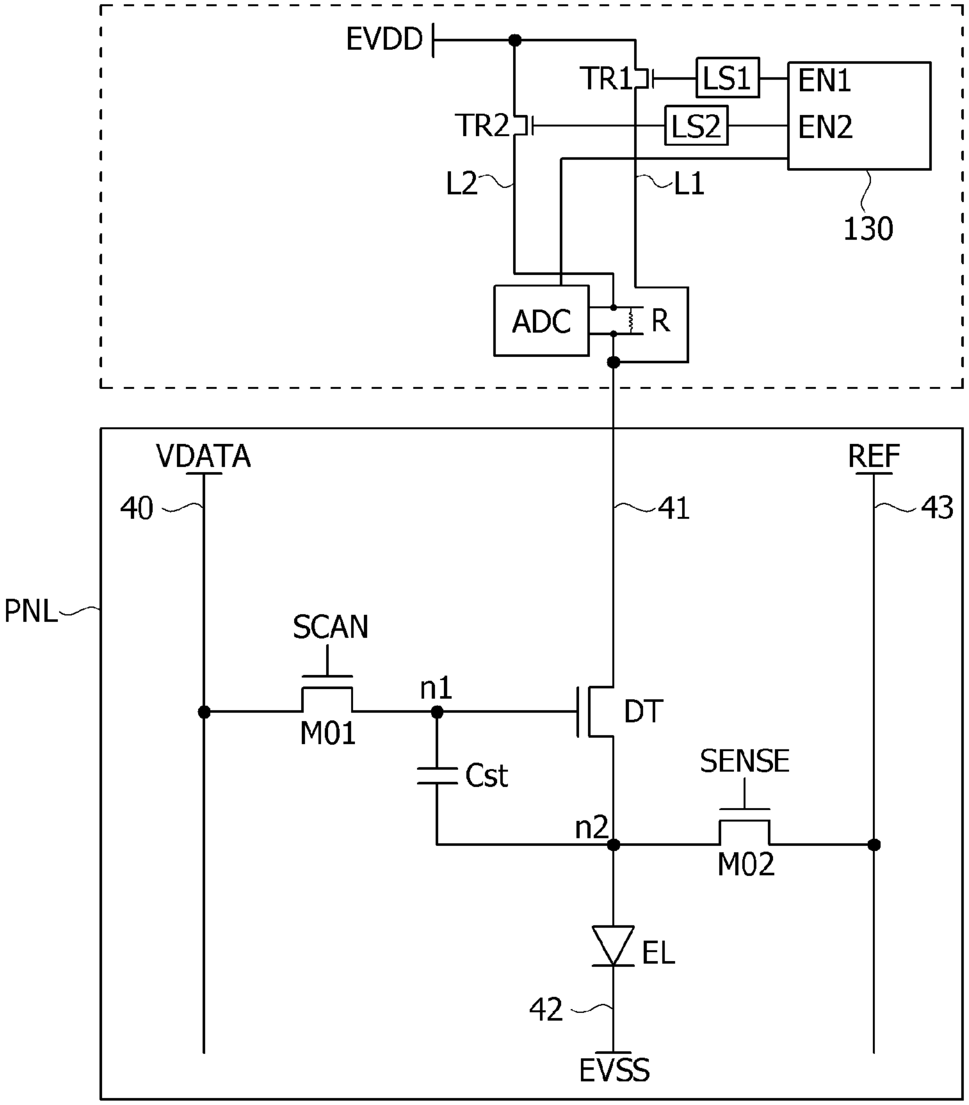
FIG. 12 is a circuit diagram illustrating a pixel circuit according to a second embodiment of the present disclosure.
Figure 13:
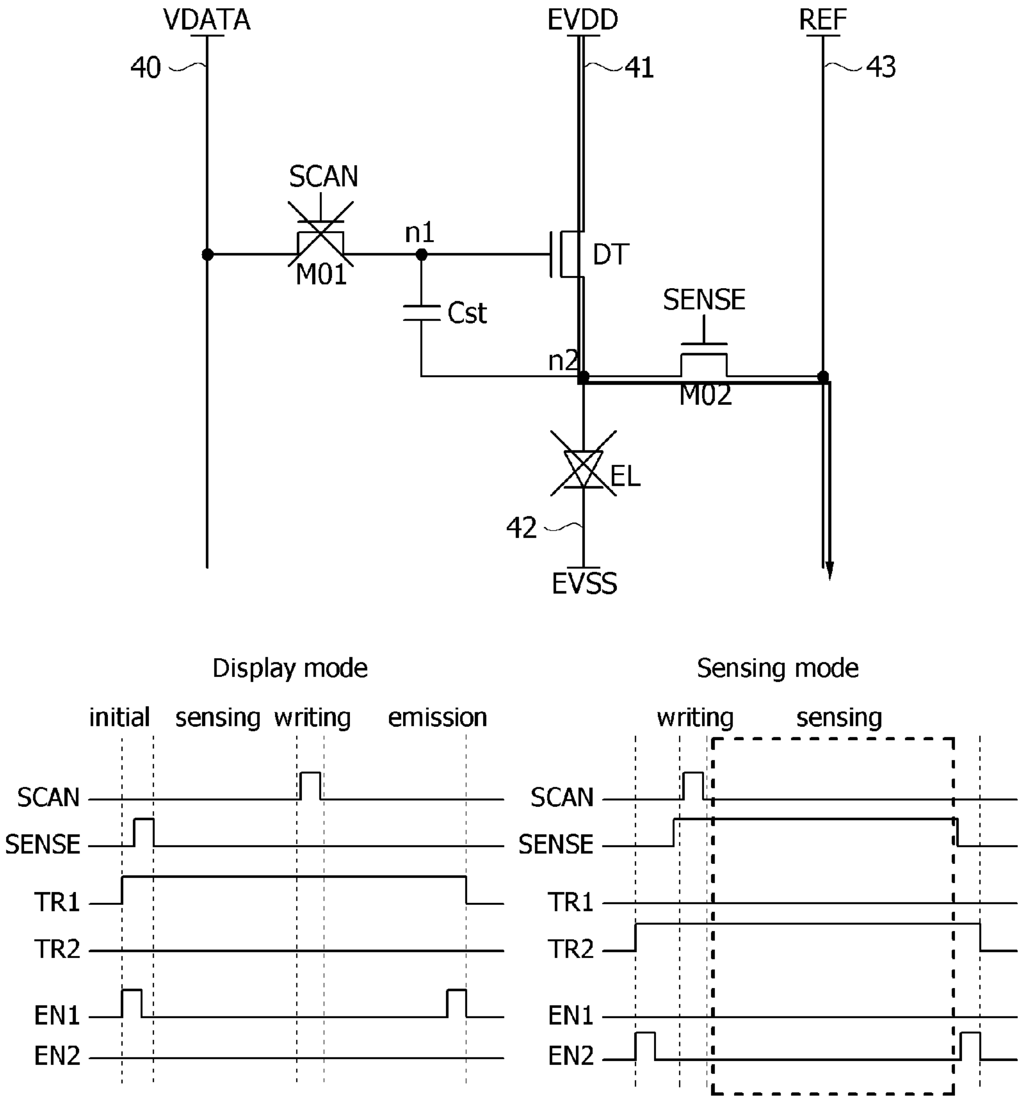
FIG. 13 is a waveform diagram illustrating a driving method of the pixel circuit shown in FIG. 12 according to an embodiment of the present disclosure.

FIG. 12 is a circuit diagram illustrating a pixel circuit according to a second embodiment of the present disclosure, and FIG. 13 is a waveform diagram illustrating a driving method of the pixel circuit shown in FIG. 12 according to one embodiment.

Referring to FIG. 12, a pixel circuit according to a second embodiment of the present disclosure includes a light-emitting element EL, a driving element DT which supplies current to the light-emitting element EL, a plurality of switch elements M01 and M02 which switch current paths connected to the driving element DT, and a first capacitor Cst which stores a gate-source voltage of the driving element DT. The driving element DT and the switch elements M01 and M02 may be implemented as N-channel oxide TFTs.

The light-emitting element EL emits light due to a current applied through a channel of the driving element DT according to a gate-source voltage Vgs of the driving element DT, which is changed according to a data voltage Vdata. An anode of the light-emitting element EL is connected to the driving element DT through a second node n2, and a cathode of the light-emitting element EL is connected to a second power line 42 to which a low-potential power voltage EVSS is applied.

The driving element DT drives the light-emitting element EL by supplying a current to the light-emitting element EL according to the gate-source voltage Vgs. The driving element DT includes a gate electrode connected to a first node n1, a first electrode (or a drain electrode) connected to a first power line 41, and a second electrode (or a source electrode) connected to the second node n2.

A first switch element M01 is turned on according to a gate-on voltage of a scan signal SCAN to connect a data voltage line 40 to the first node n1 and apply a data voltage. The first switch element M01 includes a gate electrode to which the scan signal SCAN is applied, a first electrode connected to the data voltage line 40 to which the data voltage is applied, and a second electrode connected to the first node n1.

A second switch element M02 is turned on according to a gate-on voltage of a sensing signal SENSE to connect a reference voltage line 43 to the second node n2 and apply a reference voltage. The second switch element M02 includes a gate electrode to which the sensing signal SENSE is applied, a first electrode connected to the reference voltage line 43 to which the reference voltage is applied, and a second electrode connected to the second node n2.

The first capacitor Cst may be connected between the first node n1 and the second node n2. The first capacitor Cst may charge the gate-source voltage Vgs of the driving element DT.

Referring to FIG. 13, in the embodiment, during a sensing period in which a second selection switch element TR2 is turned on by a second enable signal EN2 during the sensing mode, since the first switch element M01 is turned off and the second switch element M02 is turned on, it is possible to perform current sensing without the light-emitting element emitting light by forming a current path through which a current flowing through a pixel driving voltage line 41 does not flow through the light-emitting element, but flows through the reference voltage line 43.

Figure 14:
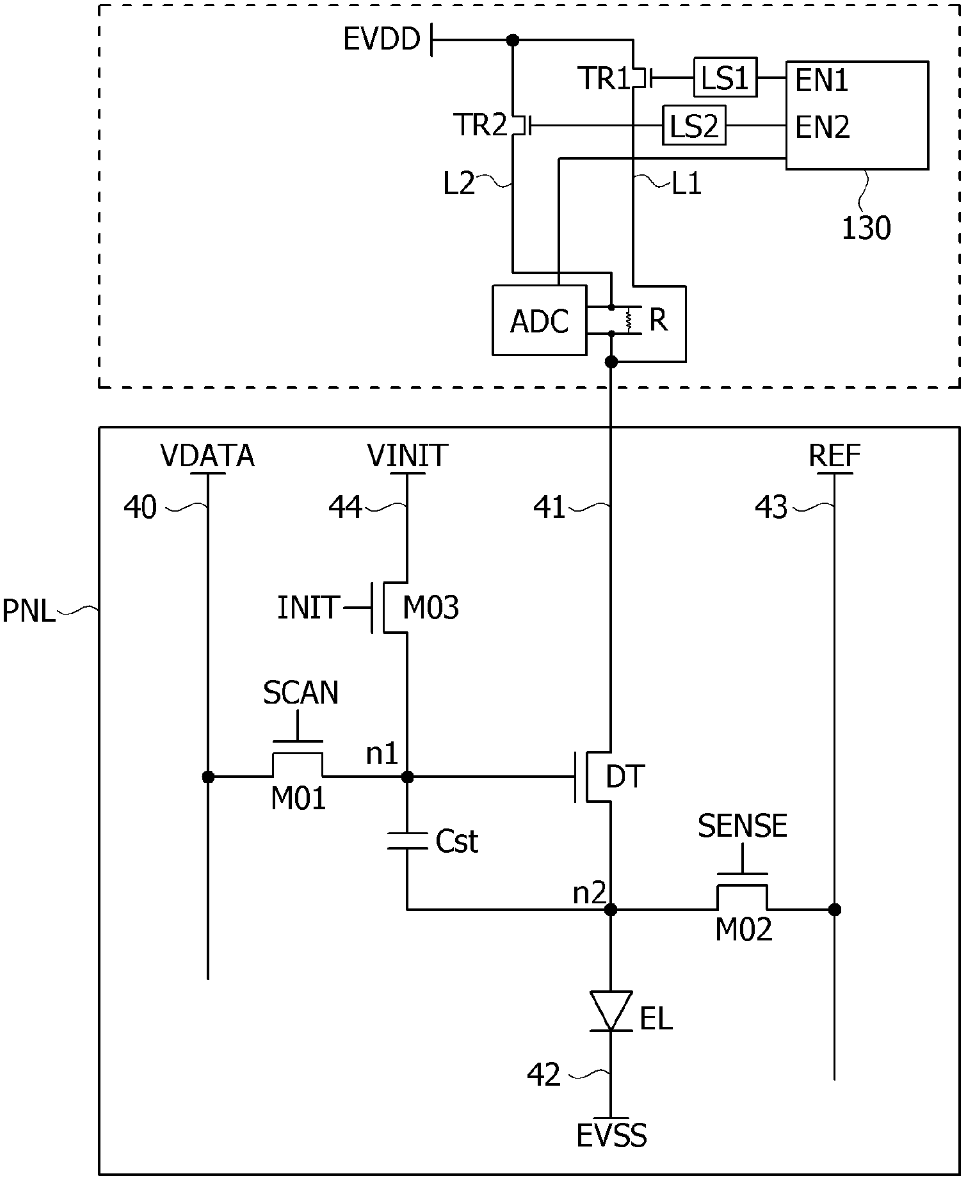
FIG. 14 is a circuit diagram illustrating a pixel circuit according to a third embodiment of the present disclosure.
Figure 15:
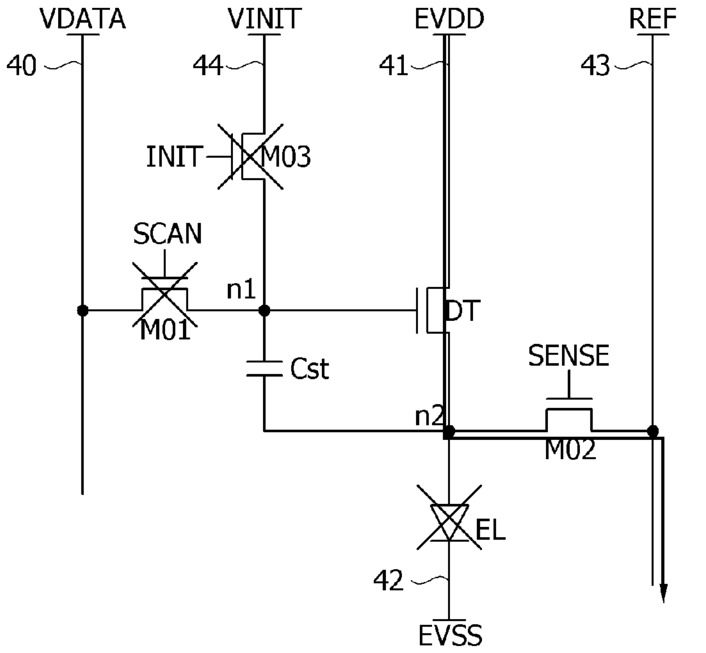
FIG. 15 is a waveform diagram illustrating a driving method of the pixel circuit shown in FIG. 14 according to an embodiment of the present disclosure.
Figure 15:
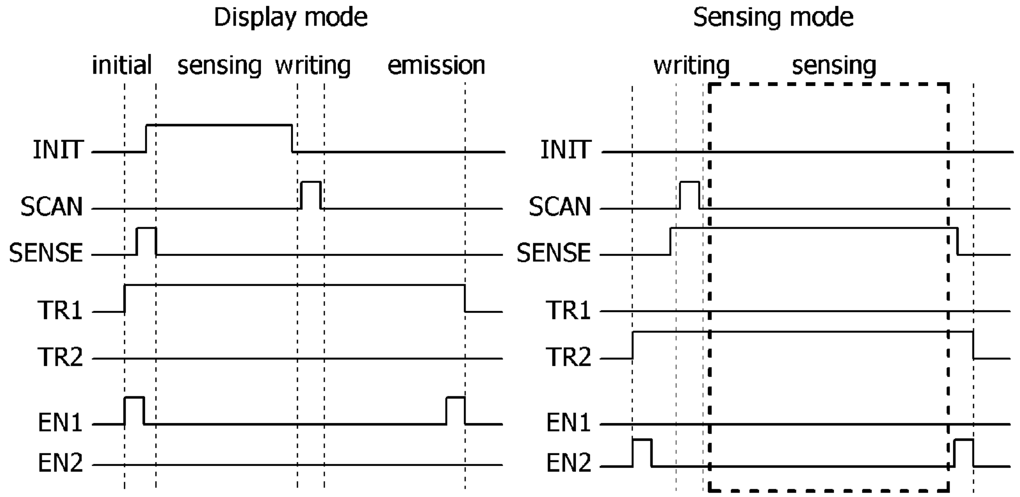

FIG. 14 is a circuit diagram illustrating a pixel circuit according to a third embodiment of the present disclosure, and FIG. 15 is a waveform diagram illustrating a driving method of the pixel circuit shown in FIG. 14 according to one embodiment.

Referring to FIG. 14, a pixel circuit according to a third embodiment of the present disclosure includes a light-emitting element EL, a driving element DT which supplies current to the light-emitting element EL, a plurality of switch elements M01, M02, and M03 which switch current paths connected to the driving element DT, and a first capacitor Cst which stores a gate-source voltage of the driving element DT. The driving element DT and the switch elements M01, M02, and M03 may be implemented as N-channel oxide TFTs.

The light-emitting element EL emits light due to a current applied through a channel of the driving element DT according to a gate-source voltage Vgs of the driving element DT, which is changed according to a data voltage Vdata. An anode of the light-emitting element EL is connected to the driving element DT through a second node n2, and a cathode of the light-emitting element EL is connected to a second power line 42 to which a low-potential power voltage EVSS is applied.

The driving element DT drives the light-emitting element EL by supplying a current to the light-emitting element EL according to the gate-source voltage Vgs. The driving element DT includes a gate electrode connected to a first node n1, a first electrode (or a drain electrode) connected to a third node n3, and a second electrode (or a source electrode) connected to the second node n2.

A first switch element M01 is turned on according to a gate-on voltage of a scan signal SCAN to connect a data voltage line 40 to the first node n1 and apply a data voltage. The first switch element M01 includes a gate electrode to which the scan signal SCAN is applied, a first electrode connected to the data voltage line 40 to which the data voltage is applied, and a second electrode connected to the first node n1.

A second switch element M02 is turned on according to a gate-on voltage of a sensing signal SENSE to connect a reference voltage line 43 to the second node n2 and apply a reference voltage. The second switch element M02 includes a gate electrode to which the sensing signal SENSE is applied, a first electrode connected to the reference voltage line 43 to which the reference voltage is applied, and a second electrode connected to the second node n2.

A third switch element M03 is turned on according to a gate-on voltage of an initialization signal INIT to connect an initialization voltage line 44 to the first node n1 to apply an initialization voltage VINIT. The third switch element M03 includes a gate electrode to which the initialization signal INIT is applied, a first electrode connected to the initialization voltage line 44, and a second electrode connected to the first node n1.

The first capacitor Cst may be connected between the first node n1 and the second node n2. The first capacitor Cst may charge the gate-source voltage Vgs of the driving element DT.

Referring to FIG. 15, in the embodiment, during a sensing period in which a second selection switch element TR2 is turned on by a second enable signal EN2 during the sensing mode, since the first switch element M01 and the third switch element M03 are turned off and the second switch element M02 is turned on, it is possible to perform current sensing without making the light-emitting element emit light by forming a current path through which a current flowing through a pixel driving voltage line 41 does not flow through the light-emitting element but flows through the reference voltage line 43.

Figure 16:
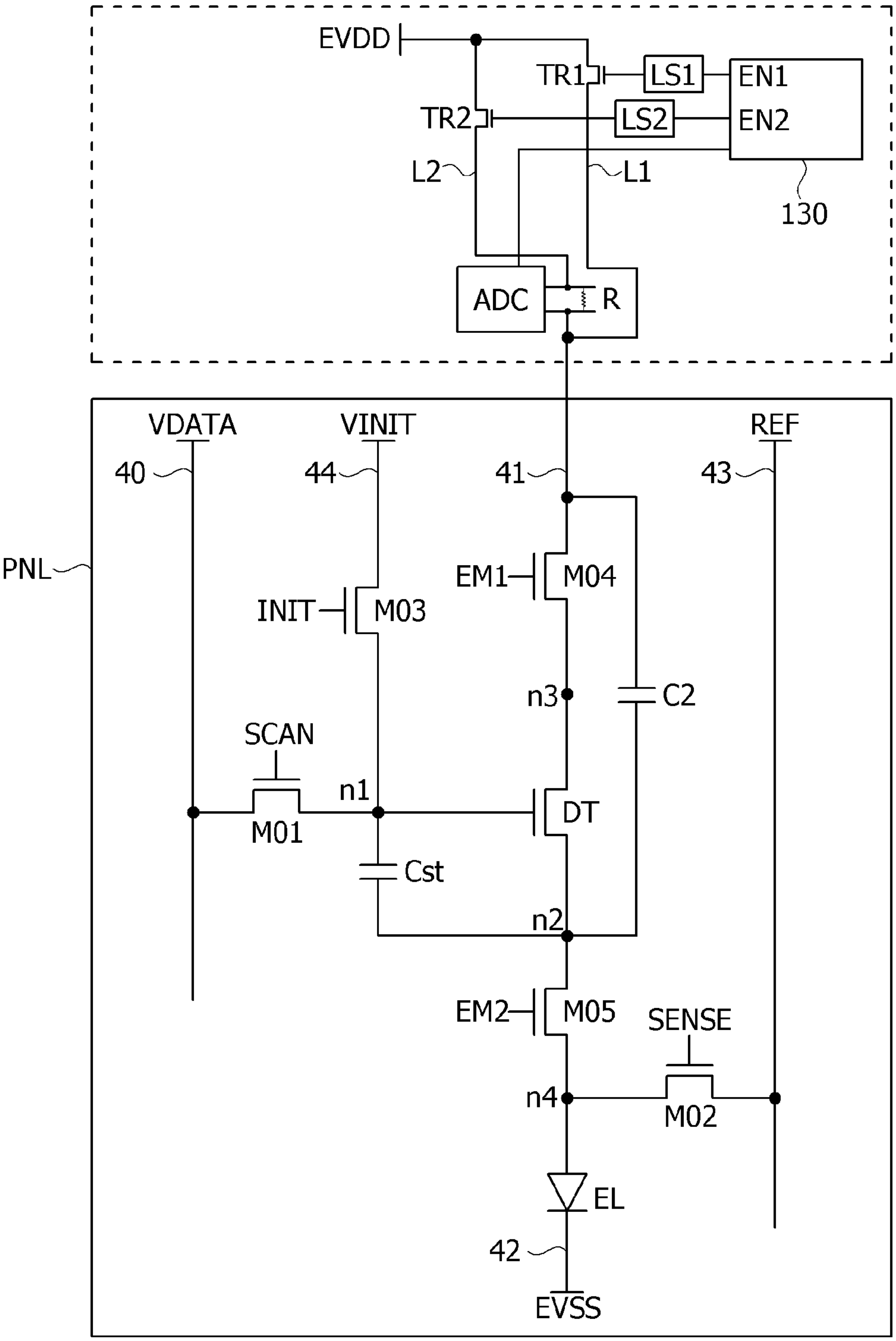
FIG. 16 is a circuit diagram illustrating a pixel circuit according to a fourth embodiment of the present disclosure.
Figure 17:
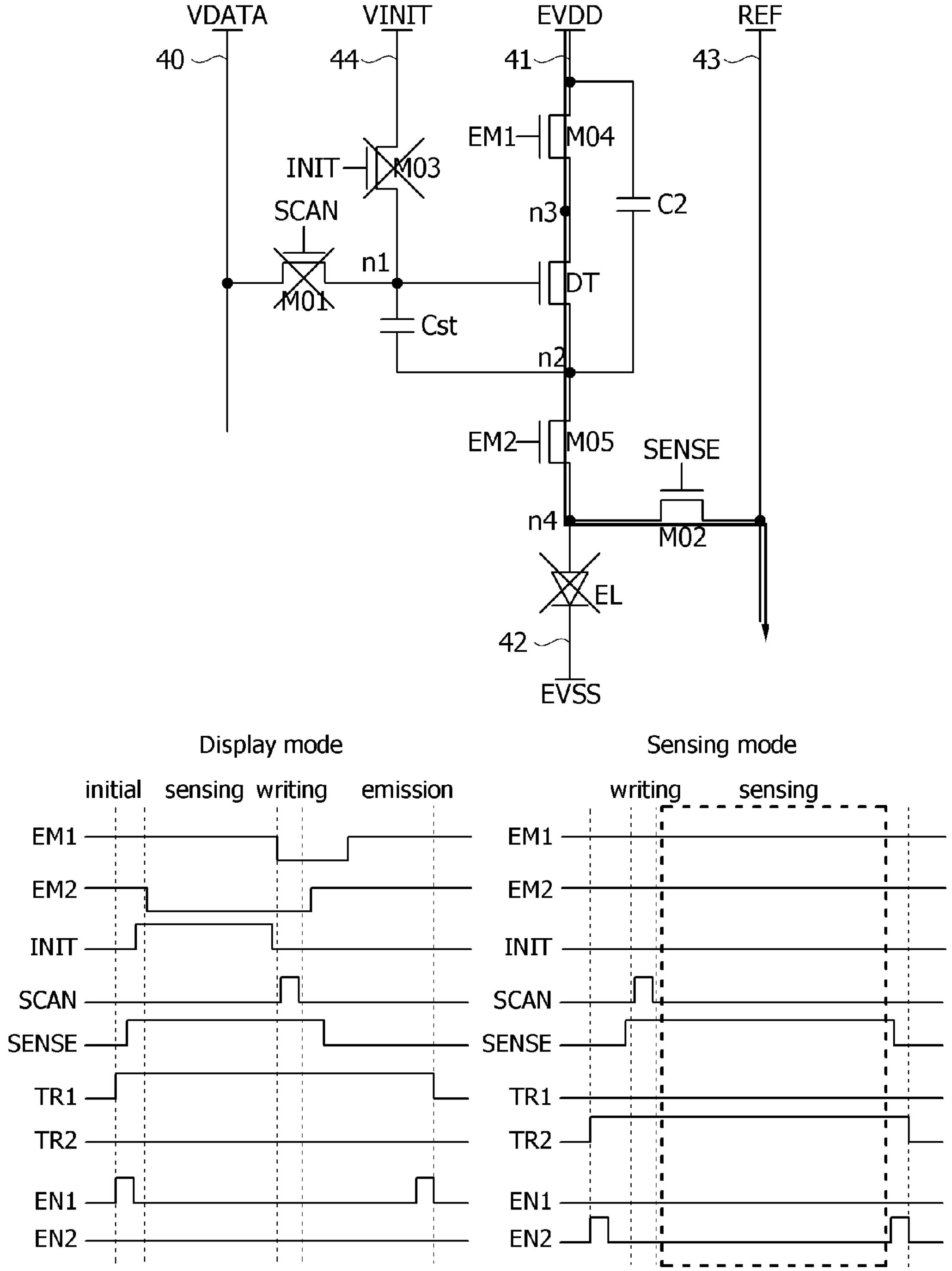
FIG. 17 is a waveform diagram illustrating a driving method of the pixel circuit shown in FIG. 16 according to an embodiment of the present disclosure.

FIG. 16 is a circuit diagram illustrating a pixel circuit according to a fourth embodiment of the present disclosure, and FIG. 17 is a waveform diagram illustrating a driving method of the pixel circuit shown in FIG. 16.

Referring to FIG. 16, a pixel circuit according to a fourth embodiment of the present disclosure includes a light-emitting element EL, a driving element DT which supplies current to the light-emitting element EL, a plurality of switch elements M01, M02, M03, M04, and M05 which switch current paths connected to the driving element DT, and a first capacitor Cst which stores a gate-source voltage of the driving element DT. The driving element DT and the switch elements M01, M02, M03, M04, and M05 may be implemented as N-channel oxide TFTs.

The light-emitting element EL emits light due to a current applied through a channel of the driving element DT according to a gate-source voltage Vgs of the driving element DT, which is changed according to a data voltage Vdata. An anode of the light-emitting element EL is connected to the driving element DT through a fourth node n4, and a cathode of the light-emitting element EL is connected to a second power line 42 to which a low-potential power voltage EVSS is applied.

The driving element DT drives the light-emitting element EL by supplying a current to the light-emitting element EL according to the gate-source voltage Vgs. The driving element DT includes a gate electrode connected to a first node n1, a first electrode (or a drain electrode) connected to a third node n3, and a second electrode (or a source electrode) connected to the second node n2.

A first switch element M01 is turned on according to a gate-on voltage of a scan signal SCAN to connect a data voltage line 40 to the first node n1 and apply a data voltage. The first switch element M01 includes a gate electrode to which the scan signal SCAN is applied, a first electrode connected to the data voltage line 40 to which the data voltage is applied, and a second electrode connected to the first node n1.

A second switch element M02 is turned on according to a gate-on voltage of a sensing signal SENSE to connect a reference voltage line 43 to the fourth node n4 and apply a reference voltage. The second switch element M02 includes a gate electrode to which the sensing signal SENSE is applied, a first electrode connected to the reference voltage line 43 to which the reference voltage is applied, and a second electrode connected to the fourth node n4.

A third switch element M03 is turned on according to a gate-on voltage of an initialization signal INIT to connect an initialization voltage line 44 to the first node n1 to apply an initialization voltage VINIT. The third switch element M03 includes a gate electrode to which the initialization signal INIT is applied, a first electrode connected to the initialization voltage line 44, and a second electrode connected to the first node n1.

A fourth switch element M04 is turned on according to a gate-on voltage of a first EM signal EM1 to connect a first power line 41 to the third node n3 to apply a pixel driving voltage EVDD. The fourth switch element M04 includes a gate electrode to which the first EM signal EM1 is applied, a first electrode connected to the first power line 41, and a second electrode connected to the third node n3.

A fifth switch element M05 is turned on according to a gate-on voltage of a second EM signal EM2 to connect the fourth node n4 to the second node n2. The fifth switch element M05 includes a gate electrode to which the second EM signal EM2 is applied, a first electrode connected to the second node n2, and a second electrode connected to the fourth node n4.

The first capacitor Cst may be connected between the first node n1 and the second node n2. The first capacitor Cst may charge the gate-source voltage Vgs of the driving element DT.

A second capacitor C2 may be connected between the first power line 41 and the second node n2.

Referring to FIG. 17, in the embodiment, during a sensing period in which a second selection switch element TR2 is turned on by a second enable signal EN2, since the first switch element M01 and the third switch element M03 are turned off and the second switch element M02, the fourth switch element M04, and the fifth switch element M05 are turned on, it is possible to perform current sensing without making the light-emitting element emit light by forming a current path through which a current flowing through the pixel driving voltage line 41 does not flow through the light-emitting element but flows through the reference voltage line 43.

Figure 18:
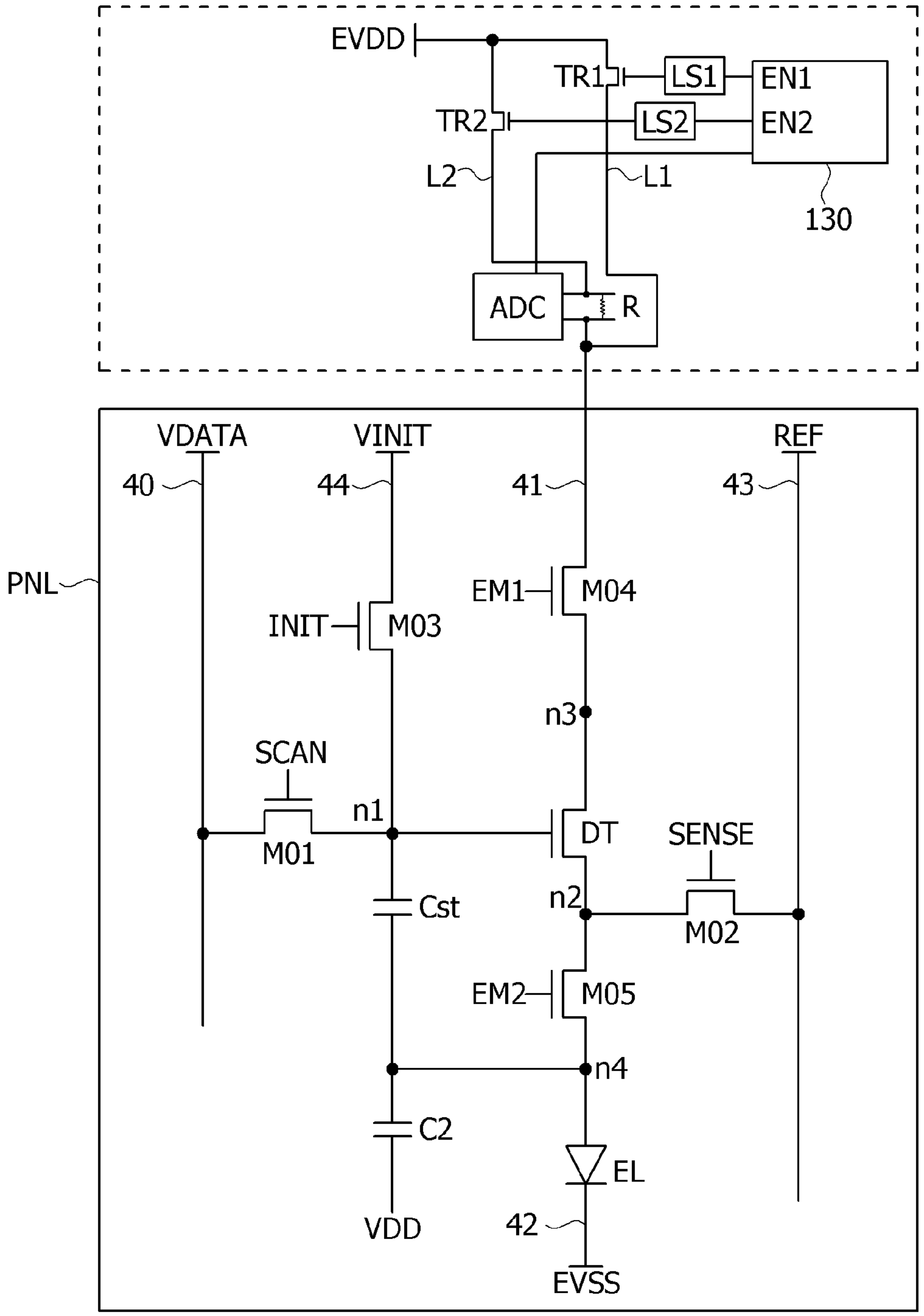
FIG. 18 is a circuit diagram illustrating a pixel circuit according to a fifth embodiment of the present disclosure.
Figure 19:
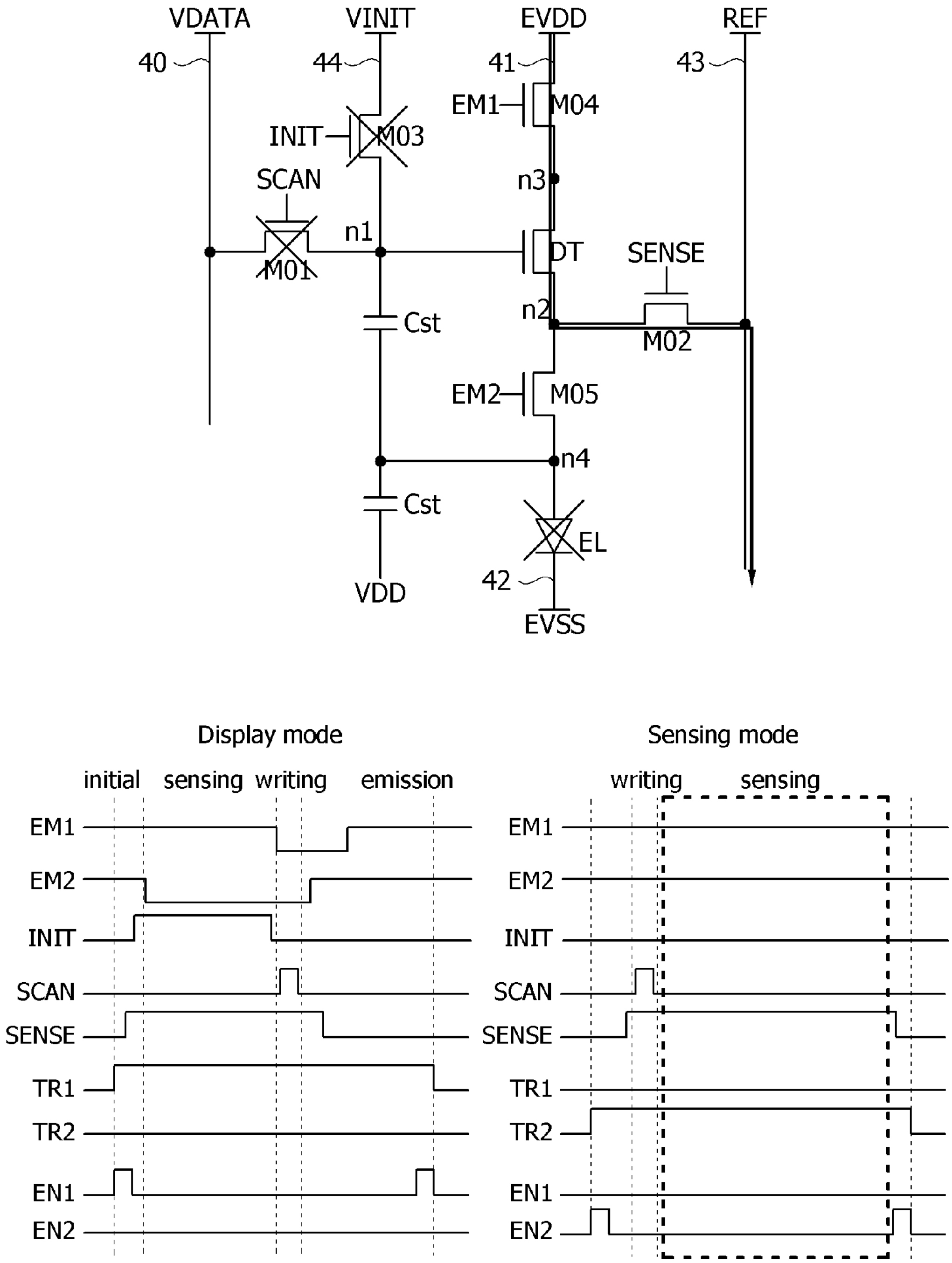
FIG. 19 is a waveform diagram illustrating a driving method of the pixel circuit shown in FIG. 18 according to an embodiment of the present disclosure.

FIG. 18 is a circuit diagram illustrating a pixel circuit according to a fifth embodiment of the present disclosure, and FIG. 19 is a waveform diagram illustrating a driving method of the pixel circuit shown in FIG. 18.

Referring to FIG. 18, a pixel circuit according to a fifth embodiment of the present disclosure includes a light-emitting element EL, a driving element DT which supplies current to the light-emitting element EL, a plurality of switch elements M01, M02, M03, M04, and M05 which switch current paths connected to the driving element DT, and a first capacitor Cst which stores a gate-source voltage of the driving element DT. The driving element DT and the switch elements M01, M02, M03, M04, and M05 may be implemented as N-channel oxide TFTs.

The light-emitting element EL emits light due to a current applied through a channel of the driving element DT according to a gate-source voltage Vgs of the driving element DT, which is changed according to a data voltage Vdata. An anode of the light-emitting element EL is connected to the driving element DT through a fourth node n4, and a cathode of the light-emitting element EL is connected to a second power line 42 to which a low-potential power voltage EVSS is applied.

The driving element DT drives the light-emitting element EL by supplying a current to the light-emitting element EL according to the gate-source voltage Vgs. The driving element DT includes a gate electrode connected to a first node n1, a first electrode (or a drain electrode) connected to a third node n3, and a second electrode (or a source electrode) connected to the second node n2.

A first switch element M01 is turned on according to a gate-on voltage of a scan signal SCAN to connect a data voltage line 40 to the first node n1 and apply a data voltage. The first switch element M01 includes a gate electrode to which the scan signal SCAN is applied, a first electrode connected to the data voltage line 40 to which the data voltage is applied, and a second electrode connected to the first node n1.

A second switch element M02 is turned on according to a gate-on voltage of a sensing signal SENSE to connect a reference voltage line 43 to the second node n2 and apply a reference voltage. The second switch element M02 includes a gate electrode to which the sensing signal SENSE is applied, a first electrode connected to the reference voltage line 43 to which the reference voltage is applied, and a second electrode connected to the second node n2.

A third switch element M03 is turned on according to a gate-on voltage of an initialization signal INIT to connect an initialization voltage line 44 to the first node n1 to apply an initialization voltage VINIT. The third switch element M03 includes a gate electrode to which the initialization signal INIT is applied, a first electrode connected to the initialization voltage line 44, and a second electrode connected to the first node n1.

A fourth switch element M04 is turned on according to a gate-on voltage of a first EM signal EM1 to connect a first power line 41 to the third node n3 to apply a pixel driving voltage EVDD. The fourth switch element M04 includes a gate electrode to which the first EM signal EM1 is applied, a first electrode connected to the first power line 41, and a second electrode connected to the third node n3.

A fifth switch element M05 is turned on according to a gate-on voltage of a second EM signal EM2 to connect the fourth node n4 to the second node n2. The fifth switch element M05 includes a gate electrode to which the second EM signal EM2 is applied, a first electrode connected to the second node n2, and a second electrode connected to the fourth node n4.

The first capacitor Cst may be connected between the first node n1 and the fourth node n4. The first capacitor Cst may charge the gate-source voltage Vgs of the driving element DT.

A second capacitor C2 may be connected between the fourth node n4 and a high-potential voltage line VDD.

Referring to FIG. 19, in the embodiment, during a sensing period in which a second selection switch element TR2 is turned on by a second enable signal EN2, since the first switch element M01, the third switch element M03, and the fifth switch element M05 are turned off, and the second switch element M02 and the fourth switch element M04 are turned on, it is possible to perform current sensing without making the light-emitting element emit light by forming a current path through which a current flowing through the pixel driving voltage line 41 does not flow through the light-emitting element but flows through the reference voltage line 43.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A sensing circuit configured to be connected to a display panel to sense electrical characteristics of a plurality of pixels included in the display panel, the sensing circuit comprising:

a first external power line that supplies a pixel driving voltage, the first external power line connected to a pixel power line that applies the pixel driving voltage to the plurality of pixels;

a second external power line that supplies the pixel driving voltage, the second external power line connected to the pixel power line;

a first selection switch element connected between the first external power line and a voltage source, the first selection switch element controlled by a first enable signal;

a current sensor connected between the second external power line and the pixel power line; and a second selection switch element connected between the current sensor and the voltage source, the second selection switch element controlled by a second enable signal, wherein the first selection switch element is turned on responsive to the first enable signal, the first selection switch element while turned on connects the first external power line and the voltage source such that the pixel driving voltage is supplied to the pixel power line via the first external power line during an image display period in which the plurality of pixels are driven, and the second selection switch element is turned on responsive to the second enable signal, the second selection switch element while turned on connects the second external power line and the voltage source such that a current flowing through the second external power line is measured by the current sensor and the pixel driving voltage is supplied to the pixel power line via the second external power line during a sensing period during which the electrical characteristics of the plurality of pixels are sensed.

2. The sensing circuit of claim 1, wherein each of the first selection switch element and the second selection switch element includes a predetermined number of selection switch elements connected in parallel, and the predetermined number is based on a maximum value of a current flowing through the display panel or widths of the first external power line and the second external power line.

3. The sensing circuit of claim 2, wherein the predetermined number is a greater value among values determined using the maximum value of the current flowing through the display panel and a width of the first external power line or a width of the second external power line.

4. The sensing circuit of claim 2, wherein the predetermined number is a value acquired by dividing the maximum value of the current flowing through the display panel by a maximum value of current flowing through the second selection switch element.

5. The sensing circuit of claim 2, wherein the predetermined number is a value acquired by dividing one of a width of the first external power line or a width of the second external power line by one of a width of the first selection switch element or a width the second selection switch element.

6. The sensing circuit of claim 1, further comprising:

a timing controller including a first pin configured to output the first enable signal and a second pin configured to output the second enable signal;

a first level shifter connected to the first pin, the first level shifter configured to convert the first enable signal to a predetermined level to output the first enable signal to the first selection switch element; and a second level shifter connected to the second pin, the second level shifter configured to convert the second enable signal to a predetermined level to output the second enable signal to the second selection switch element.

7. The sensing circuit of claim 1, wherein the current sensor comprises a shunt resistor.

8. The sensing circuit of claim 1, wherein the current sensor is mounted on a source printed circuit board (PCB) and the first selection switch element and the second selection switch element are mounted on a control PCB.

9. The sensing circuit of claim 1, wherein the current sensor, the first selection switch element, and the second selection switch element are mounted on one printed circuit board.

10. A display device comprising:

a first external power line configured to supply a pixel driving voltage;

a second external power line configured to supply the pixel driving voltage;

a pixel power line connected to the first external power line and the second external power line, the pixel power line configured to receive the pixel driving voltage from the first external power line or the second external power line;

a first selection switch element connected between the first external power line and a voltage source, the first selection switch element configured to connect the voltage source and the first external power line responsive to a first signal;

a current sensor connected between the second external power line and the pixel power line;

a second selection switch element connected between the current sensor and the voltage source, the second selection switch element configured to connect the voltage source and the second external power line responsive to a second signal; and a display panel including a subpixel connected to the pixel power line, the sub-pixel including a light emitting element configured to emit light, wherein during a sensing period during which an electrical characteristic of a part of the subpixel is sensed, the second selection switch element is turned on responsive to the second signal and the first selection switch element is turned off to connect the second external power line and the voltage source such that a current flowing through the second external power line is measured by the current sensor during the sensing period, and the pixel driving voltage is supplied to the subpixel from the pixel power line via the second external power line without the light emitting element emitting light during the sensing period.

11. The display device of claim 10, wherein during an image display period, the first selection switch element is turned on responsive to the first signal and the second selection switch element is turned off, the first selection switch element while turned on connects the first external power line and the voltage source such that the pixel driving voltage is supplied to the pixel power line via the first external power line during the image display period during which the light emitting element of the subpixel emits light.

12. The display device of claim 10, wherein the subpixel further comprises:

a driving transistor including a first electrode of the driving transistor, a gate electrode of the driving element that is connected to a first node, and a second electrode of the driving transistor that is connected to a second node, the second electrode of the driving transistor connected to an anode electrode of the light emitting element at the second node;

a first capacitor between the first node and the second node;

a first switch transistor including a first electrode of the first switch transistor that is connected to a data line to which a data voltage is applied, a gate electrode of the first switch transistor to which a scan signal is applied, and a second electrode of the first switch transistor that is connected to the first node;

a second switch transistor including a first electrode of the second switch transistor that is connected to the second node, a gate electrode of the second switch element to which a sensing signal is applied, and a second electrode of the second switch transistor that is connected to a reference voltage line to which a reference voltage is applied;

a third switch transistor including a first electrode of the third switch transistor to which an initialization voltage is applied, a gate electrode of the third switch transistor to which an initialization signal is applied, and a second electrode of the third switch transistor that is connected to the first node;

a fourth switch transistor including a first electrode of the fourth switch transistor that is connected to the pixel power line, a gate electrode of the fourth switch transistor to which an emission signal is applied, and a second electrode of the fourth switch transistor that is connected to the first electrode of the driving transistor; and a second capacitor connected to the first electrode of the fourth switch transistor and the second electrode of the driving transistor at the second node, wherein the electrical characteristic of the driving transistor is sensed during the sensing period.

13. The display device of claim 12, wherein the data voltage comprises white image data during the sensing period.

14. The display device of claim 10, wherein the first selection switch element includes a plurality of first selection switch elements connected in parallel, and the second selection switch element includes a plurality of second selection switch elements connected in parallel, wherein a total number of selection switch elements included in the plurality of first selection switch elements and a total number of selection switch elements included in the plurality of second selection switch elements is based on a maximum value of a current flowing through the display panel or a width of the first external power line and a width of the second external power line.

15. The display device of claim 14, wherein the total number of selection switch elements included in the plurality of first selection switch elements and the total number of selection switch elements included in the plurality of second selection switch elements is based on a quotient of the maximum value of the current flowing through the display panel and a maximum value of a current flowing through the second selection switch element.

16. The display device of claim 14, wherein the total number of selection switch elements included in the plurality of first selection switch elements and the total number of selection switch elements included in the plurality of second selection switch elements is based on a value acquired by dividing one of a width of the first external power line or a width of the second external power line by one of a width of the first selection switch element or a width the second selection switch element.

17. The display device of claim 14, wherein the total number of selection switch elements included in the plurality of first selection switch elements and the total number of selection switch elements included in the plurality of second selection switch elements is based on a greater value among values determined using the maximum value of the current flowing through the display panel and a width of the first external power line or a width of the second external power line.

18. The display device of claim 10, wherein the current sensor comprises a shunt resistor.

19. A display device comprising:

a display panel including a plurality of pixels that are connected to a pixel power line to which a pixel driving voltage is supplied, the plurality of pixels divided into a plurality of rows of pixel blocks that extend along a first direction and each pixel block including a different subset of pixels from the plurality of pixels;

a plurality of data lines that are connected to the plurality of pixels, the plurality of data lines extending along a second direction that intersects the first direction;

a plurality of gate lines that are connected to the plurality of pixels and extend along the first direction, the plurality of gate lines applying gate signals to the plurality of pixels;

a data driver configured to supply a plurality of data voltages of an image to the plurality of data lines during an image display period, and to supply sensing data to the plurality of data lines during a sensing period; and a sensing circuit configured to sense current flowing through the pixel power line that is connected to a subset of the plurality of pixels included in a pixel block from the plurality of pixel blocks during the sensing period based on the sensing data supplied to the respective subset of pixels during the sensing period, the sensing circuit including:

a first external power line that supplies the pixel driving voltage, the first external power line connected to the pixel power line;

a second external power line that supplies the pixel driving voltage, the second external power line connected to the pixel power line;

a first selection switch element connected between the first external power line and a voltage source, the first selection switch element configured to connect the voltage source and the first external power line such that the first external power line supplies the pixel driving voltage to the pixel power line responsive to a first signal;

a current sensor connected between the second external power line and the pixel power line; and a second selection switch element connected between the current sensor and the voltage source, the second selection switch element configured to connect the voltage source and the second external power line such that the second external power line supplies the pixel driving voltage to the pixel power line responsive to a second signal.

20. The display device of claim 19, wherein the first selection switch element is turned on responsive to the first signal during the image display period in which the plurality of pixels emit light, and the second selection switch element is turned on responsive to the second signal, the second selection switch element connecting the second external power line and the voltage source such that the current flowing through the pixel power line and the second external power line is measured by the current sensor and the pixel driving voltage is supplied to the pixel power line via the second external power line during the sensing period during which electrical characteristics of the subset of the plurality of pixels included in the pixel block are sensed.

21. The display device of claim 19, wherein the sensing data comprises white image data during the sensing period.

22. The display device of claim 19, wherein the first selection switch element includes a plurality of first selection switch elements connected in parallel, and the second selection switch element includes a plurality of second selection switch elements connected in parallel, wherein a total number of selection switch elements included in the plurality of first selection switch elements and a total number of selection switch elements included in the plurality of second selection switch elements is based on a maximum value of a current flowing through the display panel or a width of the first external power line and a width of the second external power line.

23. The display device of claim 22, wherein the total number of selection switch elements included in the plurality of first selection switch elements and the total number of selection switch elements included in the plurality of second selection switch elements is based on a quotient of the maximum value of the current flowing through the display panel and a maximum value of a current flowing through the second selection switch element.

24. The display device of claim 23, wherein the total number of selection switch elements included in the plurality of first selection switch elements and the total number of selection switch elements included in the plurality of second selection switch elements is based on a value acquired by dividing one of a width of the first external power line or a width of the second external power line by one of a width of the first selection switch element or a width of the second selection switch element.

25. The display device of claim 24, wherein the total number of selection switch elements included in the plurality of first selection switch elements and the total number of selection switch elements included in the plurality of second selection switch elements is based on a greater value among values determined using the maximum value of the current flowing through the display panel and a width of the first external power line or a width of the second external power line.

26. The display device of claim 19, wherein the current sensor comprises a shunt resistor.

* * * * *